United States Patent [19]

Shachar et al.

[11] Patent Number: 5,668,807
[45] Date of Patent: Sep. 16, 1997

[54] SYNCHRONIZATION OF TRANSPARENT TDM SUPERCHANNELS

[75] Inventors: Boaz Shachar, Givatayim; Nahum Rozen, Natanya; Yoram Yeivin, Petah Tikva; Eli Wietz, Hucon, all of Israel

[73] Assignee: Motorola, Inc., Schaumburg, Ill.

[21] Appl. No.: 566,418

[22] Filed: Nov. 30, 1995

[51] Int. Cl.$^6$ ................................................. H04J 3/06
[52] U.S. Cl. ........................ 370/378; 370/459; 370/509
[58] Field of Search ............................... 370/294, 360, 370/375, 376, 378, 395, 433, 437, 441, 458, 459, 479, 503, 508, 509

[56] References Cited

U.S. PATENT DOCUMENTS

| | | | |
|---|---|---|---|
| 4,718,062 | 1/1988 | Andersen | 370/354 |
| 5,144,623 | 9/1992 | Bernardini | 370/470 |
| 5,199,051 | 3/1993 | Nakabayashi et al. | 370/470 |
| 5,351,239 | 9/1994 | Black et al. | 370/476 |
| 5,430,718 | 7/1995 | Petersen | 370/378 |

OTHER PUBLICATIONS

Published May 1995 by Motorola Inc., "MC68360 Quad Integrated Communications Controller User's Manual", pp. 1-1—11-8.
Published Jul. 1995 by Motorola Inc., "MC68MH360 QUICC32 Quad Integrated Multichannel Controller Reference Manual", pp. 1-1—8-4.

*Primary Examiner*—Alphus H. Hsu
*Attorney, Agent, or Firm*—Bruce E. Hayden

[57] ABSTRACT

Transparent Time Division Multiplexer (TDM) Superchannels including multiple time slots assigned to a single logical channel are synchronized between transmitter and receiver. For a given time slot in an idle logical channel (286), the transmitter only starts transmitting output if this is the first time slot assigned to the logical channel (288) and output is available for the logical channel (290). Starting to transmit output is postponed (289) if this is not the first time slot assigned to the logical channel. Correspondingly, the receiver only expects new data blocks to start in the first time slot assigned to the logical channel.

21 Claims, 19 Drawing Sheets

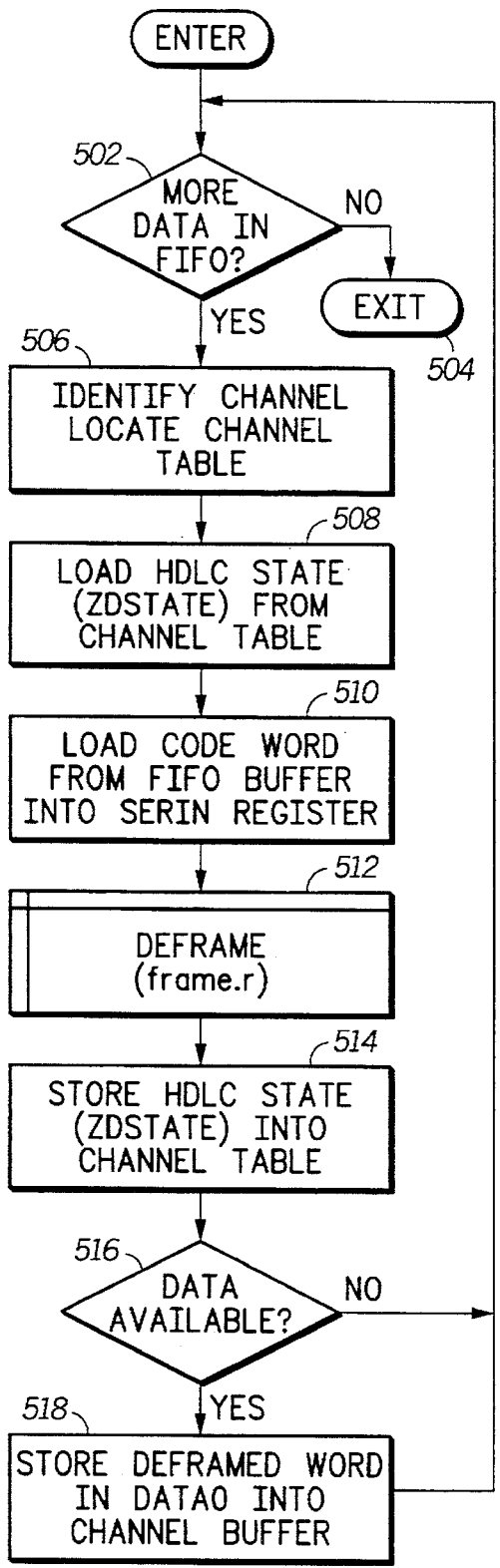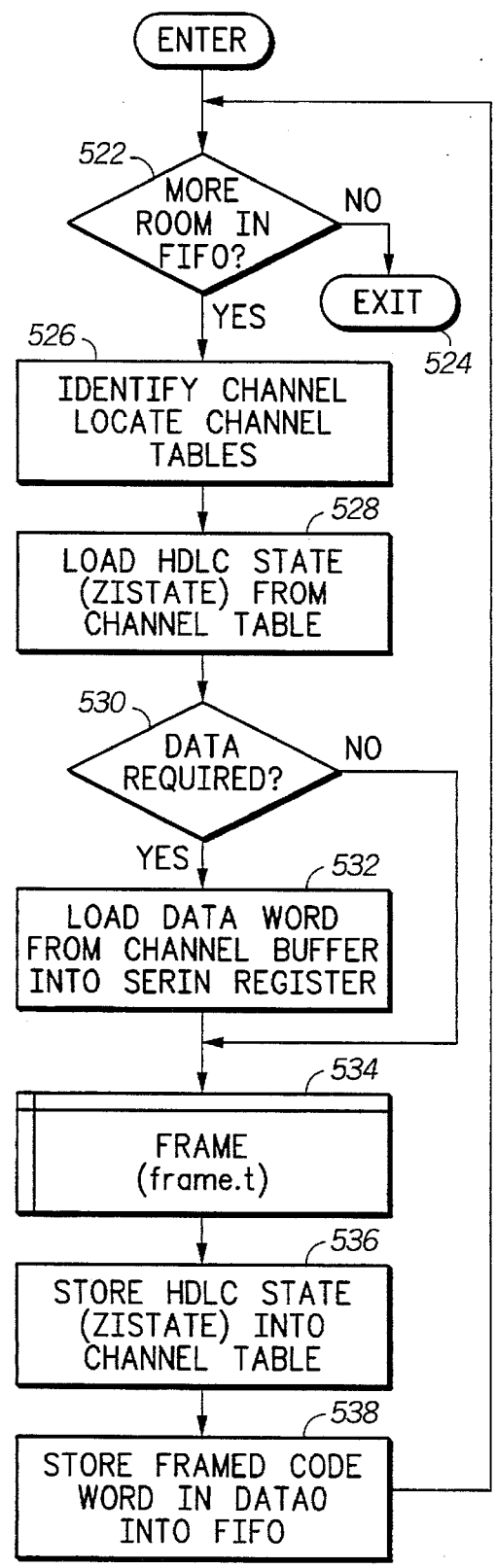
FIG. 7                    FIG. 8

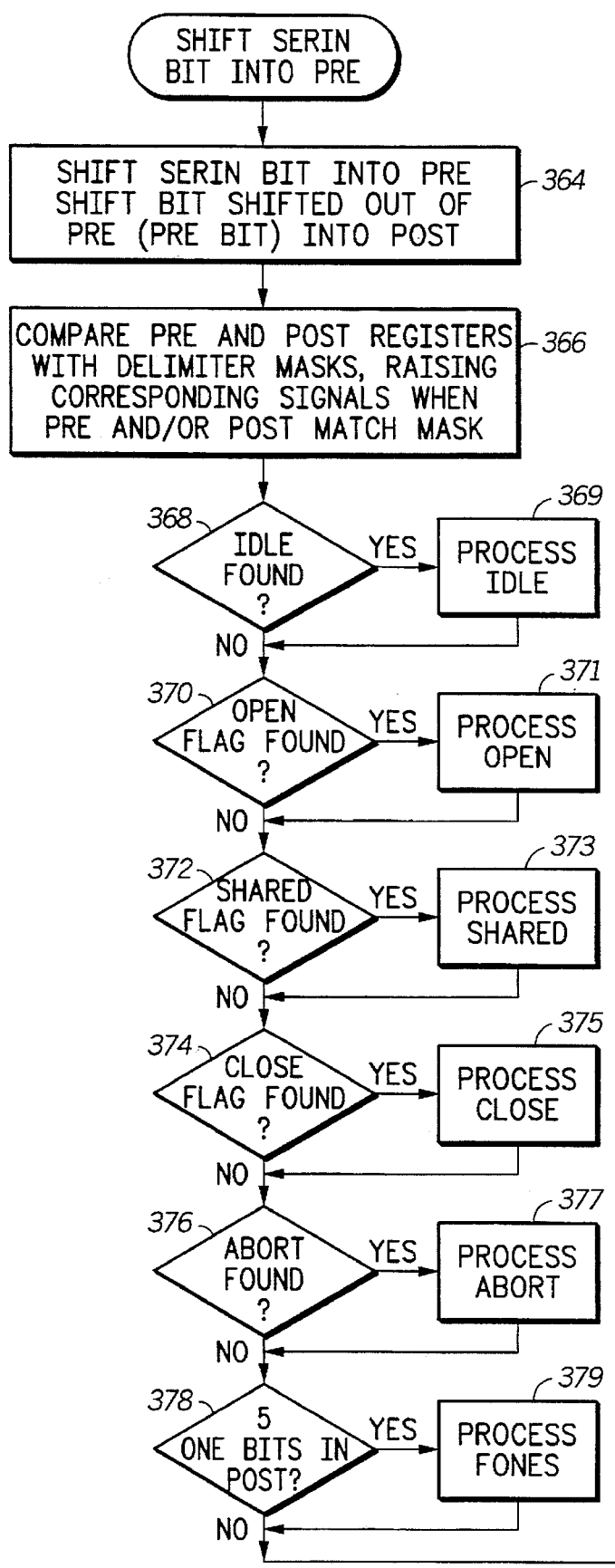
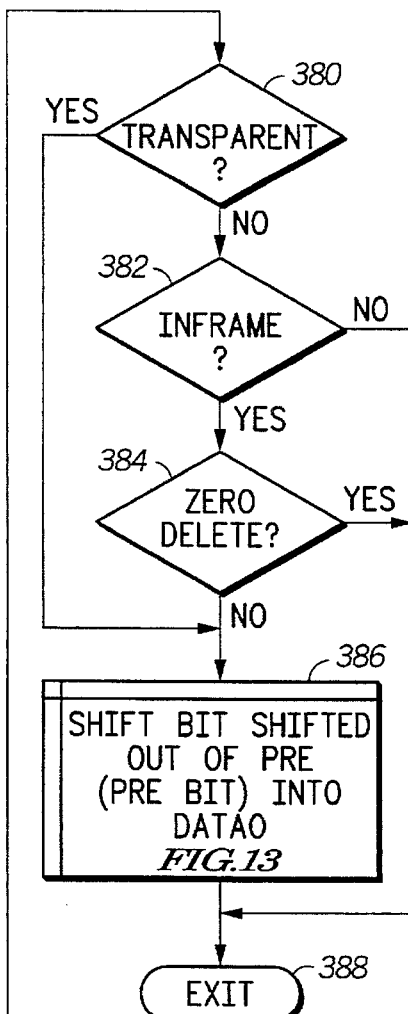
FIG.12

SYNCHRONIZATION OF TRANSPARENT TDM SUPERCHANNELS

CROSS REFERENCE TO RELATED APPLICATION

This application is related to our copending patent application entitled MULTICHANNEL HDLC FRAMING/DEFRAMING MACHINE, filed Nov. 30, 1995, having U.S. patent application Ser. No. 08/566,444, and assigned to the assignee hereof.

This application is related to our copending patent application entitled TRANSMISSION LOAD CONTROL FOR MULTICHANNEL HDLC TDM LINE, filed Nov. 30, 1995, having U.S. patent application Ser. No. 08/566,443, and assigned to the assignee hereof.

FIELD OF THE INVENTION

The present invention generally relates to data communications, and more specifically to synchronizing Time Division Multiplexer (TDM) Superchannels comprising multiple time slots assigned to a single logical channel.

BACKGROUND OF THE INVENTION

Time Division Multiplexing (TDM) is a technique where multiple logical channels are multiplexed on a single physical channel. It operates by assigning fixed length time slots to different channels in a round robin fashion.

TDM Superchannels are a technique where a logical channel is assigned more than one of the round robin time slots. If data becomes available for a Superchannel after its first time slot has been processed in a round robin circuit, starting transmission of a new block of data in other than the first time slot assigned to the Superchannel may not be recognized as such by the receiver.

SUMMARY OF THE INVENTION

In accordance with the invention, transparent Time Division Multiplexer (TDM) Superchannels comprising multiple time slots assigned to a single logical channel are synchronized between transmitter and receiver. For a given time slot in an idle logical channel, the transmitter only starts transmitting output if this is the first time slot assigned to the logical channel and output is available for the logical channel. Starting to transmit output is postponed if this is not the first time slot assigned to the logical channel. Correspondingly, the receiver only expects new data blocks to start in the first time slot assigned to the logical channel.

These and other features, and advantages, will be more clearly understood from the following detailed description taken in conjunction with the accompanying drawings. It is important to point out that there may be other embodiments of the present invention which are not specifically illustrated.

BRIEF DESCRIPTION OF THE DRAWINGS

FIG. 7 is a flow chart showing invocation of the Framer Receiver (Rx) function in accordance with the present invention;

FIG. 8 is a flow chart showing invocation of the Framer Transmitter (Tx) function in accordance with the present invention;

FIGS. 11 through 13 are flow charts showing a virtual implementation of the Framer Receive (Rx) function in accordance with the present invention;

DETAILED DESCRIPTION OF A PREFERRED EMBODIMENT

Figure 1:
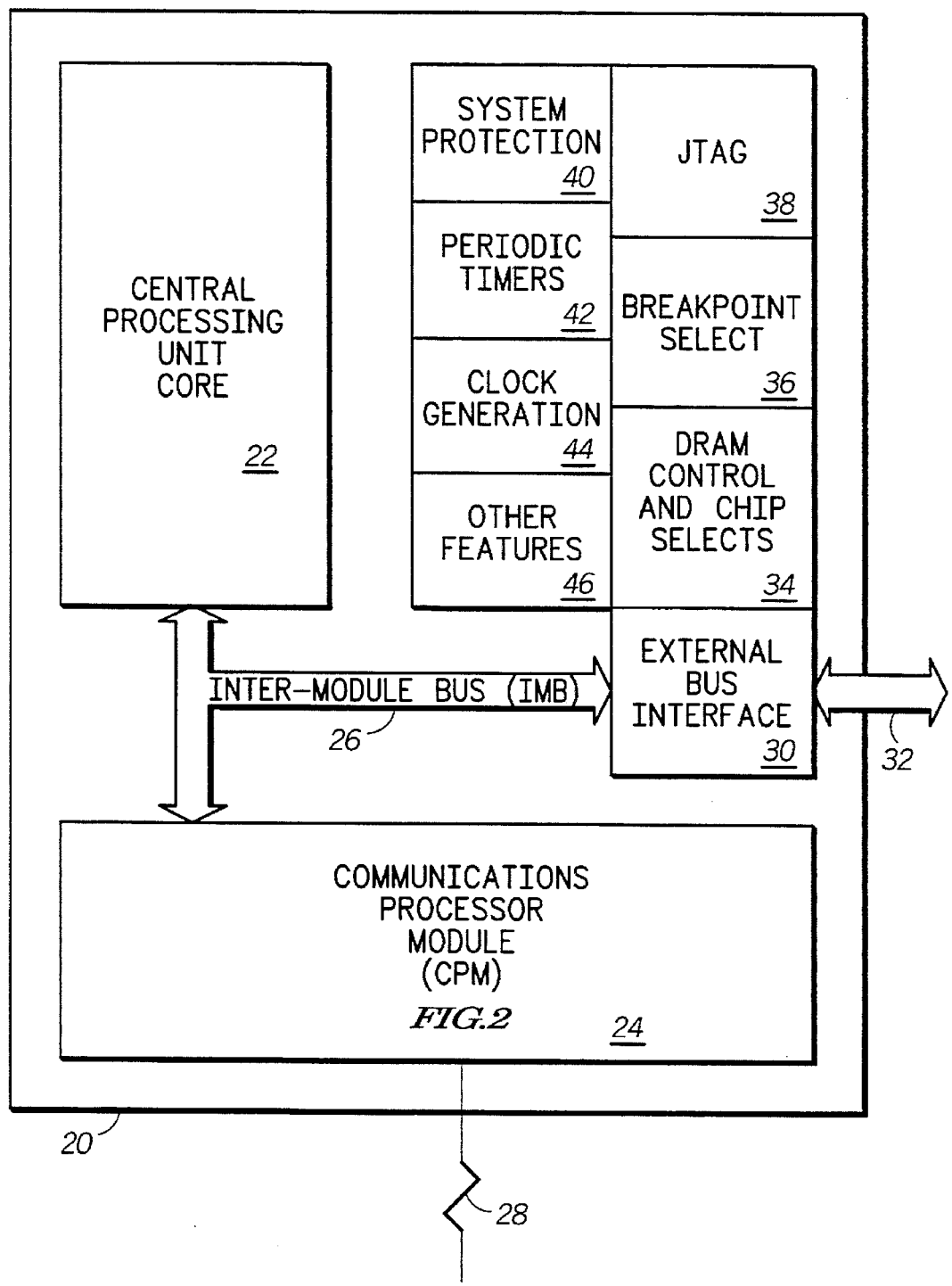
FIG. 1 is a block diagram showing the main components of an Integrated Communications System in accordance with the present invention.

In a phone system, the multiplex equipment carrying the smallest number of channels in the hierarchy of digital multiplexers is called the primary multiplexer. In the U.S. network, the primary multiplex signal is called the Data Signaling Level 1 (DS-1) signal, and the transmission system is called the T1 digital carrier system. As shown in Table T-1, a frame in the T1 system consists of 193 bits. The first bit is used to establish the beginning of the frame ("framing bit"). Following it are 192 bits comprising 24 (decimal) code words of eight bits each. There are 8,000 samples a second and each one generates a code word, therefore a code word occurs every 125μ Seconds. This is equivalent to 1.544 megabits per second (Mbps).

TABLE T-1

Frame Structure for T1 @ 1.544 Mbps

| | 0 | 1 | 2 | 3–21 | 22 | 23 |
|---|---|---|---|---|---|---|
| | | | | | | |
| | | | | | | |
| | | | | | | |
| | | | | | | |
| | | | | | | |
| | 0 | 1 | 2 | 3–21 | 22 | 23 |

193 Bits/125 μ Sec.

The European standard primary digital multiplex signal (E1) differs from the U.S. standard in that it specifies a frame of 32 (decimal) code words of eight bits each as shown in Table T-2. The first code word (or byte) in each frame is used for framing information, the seventeenth code word in the frame is used for signaling information for each channel, and the remainder of the code words (or bytes) contain encoded speech or data. There are thus 30 data bytes, one framing byte, and one signaling byte in each 32-byte frame. Since the frames must occur at the standard 8,000 per second rate, the data rate is 256 bits in 125μ Seconds or 2.048 Mbps.

TABLE T-2

Frame Structure for E1 @ 2.048 Mbps

256 Bits/125 μ Sec.

| | 1 | 2 | | | | 30 | 31 |
|---|---|---|---|---|---|---|---|
| | | | | | | | |
| | | | | | | | |
| | | | | | | | |
| | | | | | | | |
| | | | | | | | |
| | | | | | | | |
| | 1 | 2 | | | | 30 | 31 |

Note that more than one T1 or E1 channel may be dedicated to a single logical channel. This technique is called "Superchannels" and is discussed in more depth in FIGS. 23–25.

The primary OSI model Link Level data communications protocol utilized with T1 and E1 is the "High-level Data Link Control" (HDLC) protocol. HDLC is a standard (ISO 4335, 3309) originally developed by the International Organization for Standardization (ISO). An almost identical standard (ANSI X3.66) titled "Advanced Data Communications Control Procedures" (ADCCP) was adopted by the American National Standards Institute (ANSI). With very minor exceptions, ADCCP has been adopted by the U.S. National Bureau of Standards (FIPS PUB 71-1) for use on U.S. federal government procurements and by the Federal Telecommunications Standards Committee (FED-STD-1003A) as the standard for national-defense related National Communications System. A subset of HDLC titled "Link Access Procedure, Balanced" (LAP-B) was adopted by the International Telegraph and Telephone Consultative Committee (CCITT) as part of its X.25 packet-switched network standard. Finally, numerous vendors have their own HDLC variants, including SDLC by IBM and UDLC by Unisys. The remainder of this specification will use the term HDLC to include HDLC and all of its variants and progeny.

HDLC is a "bit stuffing" protocol. The protocol uses a hex 06e flag to separate blocks of data. The hex 06e flag includes six consecutive one bits. In order to guarantee identification of this flag, blocks of data cannot contain more than five consecutive one bits. This is accomplished by automatically inserting a zero bit (termed "zero insertion") after every sequence of five one bits. At the opposite end of a transmission, zero bits following five consecutive one bits are removed (termed "zero deletion").

Traditionally, high speed transmissions such as T1 and E1 channels have been multiplexed onto and demultiplexed off of their component Time Division Multiplexed (TDM) channels with stand-alone TDM multiplexers. Then each T1/E1 channel is framed/deframed by itself. There has been a growing need for integrating T1/E1 TDM multiplexing/demultiplexing with HDLC framing/deframing and the processing of the encoded data.

Motorola, Inc., assignee of this application, recently introduced the MC68360 Quad Integrated Communications Controller (QUICC). It is described in detail in the "MC68360 Quad Integrated Communications Controller User's Manual", available as MC68360UM/AD from one of assignee's Literature Distribution Center. One such center can be reached by mail to Motorola Literature Distribution, P.O. Box 20912, Arizona 85036, U.S.A.

The MC68360 QUICC controller is a versatile one-chip integrated microprocessor and peripheral combination that can be used in a variety of controller applications. It was designed to particularly excel in communications activities. A Time Slot Assignor is used to Multiplex and Demultiplex multiple channels on a single T1/D1 line. Up to four HDLC channels can be framed/deframed at a time.

A successor to the MC68360 QUICC has been introduced by assignee Motorola, Inc. as the MC68MH360 QUICC32. Reference material for this controller is available through the Literature Distribution Centers as "MC68MH360RM/AD". The QUICC32 supports framing and deframing of up to 32 channels operating at T1/E1 speeds. The MC68360UM/AD and MC68MH360RM/AD manuals are incorporated herein by reference.

Hereinbelow, the terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one. The term "bus" will be used to refer to a plurality of signals which may be used to transfer one or more various types of information, such as data, addresses, control, or status. Finally, all numbers are displayed in hexadecimal ("hex") unless indicated otherwise explicitly or through context.

FIG. 1 is a block diagram showing the main components of an Integrated Communications System 20. The Integrated Communications System 20 contains a CPU core 22 connected to a Communications Processor Module (CPM) 24 via an Inter-Module Bus (IMB) 26. The CPU core 22 can be standard processor. For example, the MC68360 utilizes a Motorola 68060 core capable of executing the 68060 instruction set. More recently, a RISC based PowerPC CPU Core 22 has been introduced. The CPM 24 communicates over T1 and E1 lines utilizing one or more communications Lines 28.

Also attached to the Inter-Module Bus (IMB) 26 is an External Bus Interface 30. It is used to connect to an External Bus 32. The External Bus 32 can be used to connect a plurality of Integrated Communications Systems 20 together.

The Integrated Communications System 20 also includes DRAM Controller and Chip Selects 34, Breakpoint logic 36, JTAG circuitry 38, System Protection 40, Periodic Timers 42, Clock Generation 44, and other features 46. One use of Clock Generation 44 is to provide the communications clock signals previously generated by a modem.

Figure 2:
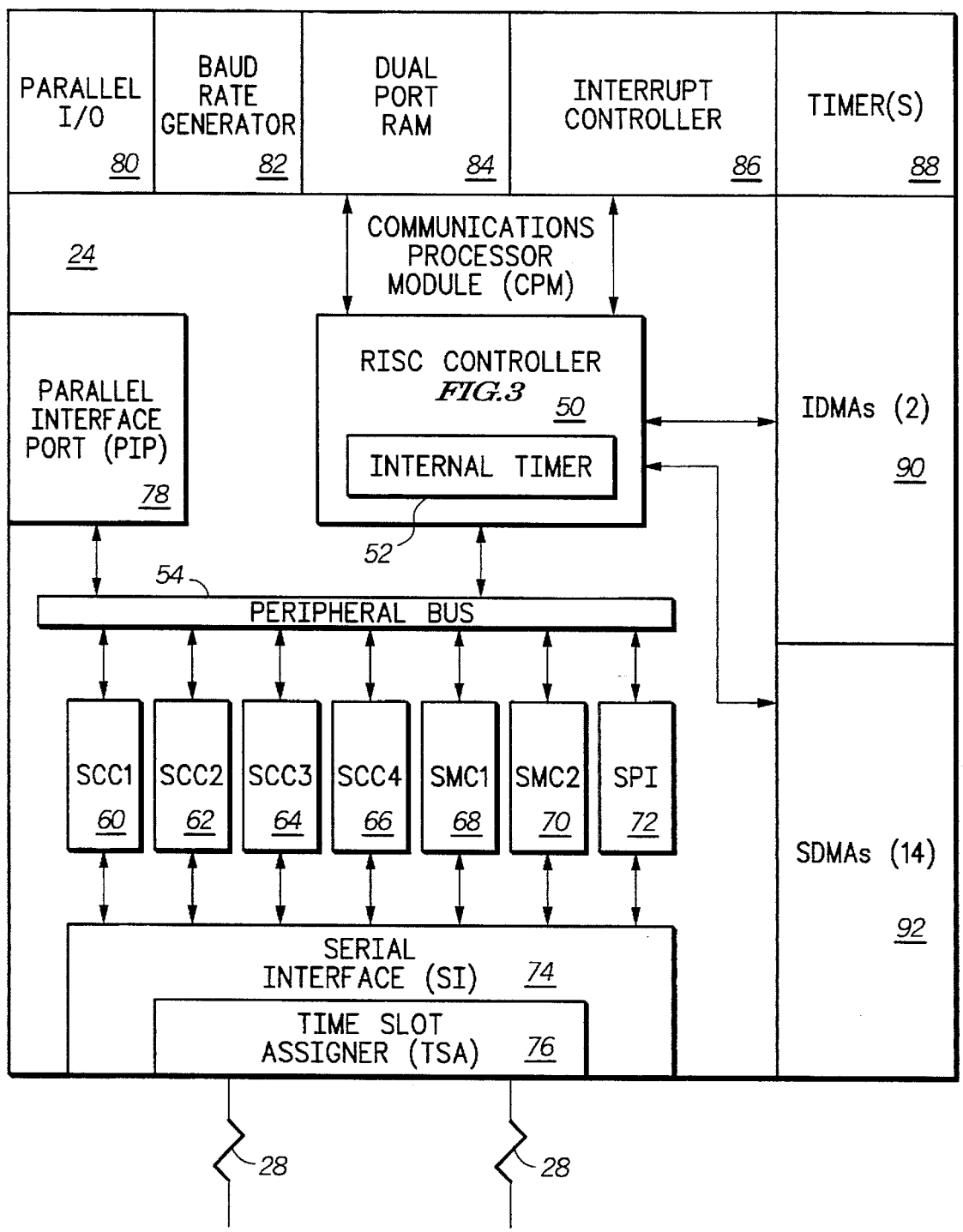
FIG. 2 is a block diagram showing the major components in an implementation of a Communications Processor Module (CPM) shown in FIG. 1.

FIG. 2 is a block diagram showing the major components in an implementation of a Communications Processor Module (CPM) 24. Its operation is controlled by an embedded RISC Controller 50. The RISC Controller 50 includes internal timers 52. It is connected via a Peripheral Bus 54 to four full-duplex Serial Communication Controllers (SCCs), SCC1 60, SCC2 62, SCC3 64 SCC4 66, two Serial Management Controllers (SMCs), SMC1 68, SMC2 70, and one Serial Peripheral Interface (SPI) 72. All are connected to a Serial Interface (SI) unit 74 that includes a Time Slot Assignor (TSA) 76. The CPM 24 communicates via communications lines 28 connected to the TSA 76 and SI 74. Also connected to the Peripheral Bus 54 is a Parallel Interface Port (PIP) 78.

The CPM 24 has four SCCs 60, 62, 64, 66 that can be configured independently to implement different protocols. Together, they can be used to implement bridging functions, routers, gateways, and interface with a wide variety of standard and proprietary networks and protocols. The SCCs do not include the physical interface, but rather the logic which formats and manipulates the data obtained from the physical interface.

The CPM 24 has two Serial Management Controllers (SMC) 68, 70. They are full-duplex ports that can be independently configured to support any of (currently) three protocols: UART, transparent, and GCI. In most situations, SMCs 68, 70 operate similarly to SCCs 60, 62, 64, 66, but with reduced functionality. They are perfect for such applications as providing a UART debug/monitor port to the Integrated Communications System 20.

The Serial Peripheral Interface (SPI) 72 allows the Integrated Communications System 20 to exchange data with other QUICC chips, the Motorola MC68302, M68HC11, and M68HC05 microprocessor families, and a number of peripheral devices, such as EEPROMs, real-time clocks devices, A/D converters, and ISDN devices. It is a full-duplex, synchronous, character-oriented channel that supports a four wire interface.

The Peripheral Interface Port (PIP) 78 allows the CPM to transfer data in and out over 8 or 16 parallel data bins. The pins of the PIP 78 are multiplexed with the 18 bit B parallel I/O port. The PIP 78 supports the Centronics interface and a fast parallel connection with other similar Integrated Communications Systems 20.

The Serial Interface (SI) 74 with Time Slot Assignor (TSA) 76 connects the physical layer serial lines to the four SCCs 60, 62, 64, 66 and two SMCs 68, 70. In its simplest configuration, the SI 74 allows the four SCCs 60, 62, 64, 66 and two SMCs 68, 70 to be connected with their own set of individual pins. However, the main feature of the SI 74 is the TSA 76. The TSA 76 allows any combination of SCCs and SMCs to multiplex their data together on either one or two TDM channels. TDM is used here as a generic term that describes any serial channel that is divided into channels separated by time, such as T1 lines in the U.S. and Japan, and CEPT lines in Europe.

The CPM 24 also includes a Parallel I/O controller 80, a Baud Rate Generator 82, Dual Ported RAM 84, an Interrupt Controller 86, and four Timers 88. The RISC Controller 50 is also connected to up to two Independent Direct Memory Access (IDMA) 90 channels and up to fourteen Serial Direct Memory Access (SDMA) 92 channels.

The fourteen SDMA 92 channels are permanently assigned to the four SCCs 60, 62, 64, 66, two SMCs 68, 70 and single SPI 72. Each channel is permanently assigned to service either the receive or transmit operation of an SCC, SMC, or SPI. The two IDMA channels 90 are more general purpose, allowing Direct Memory transfer of data between any combination of memory and I/O.

Figure 3:
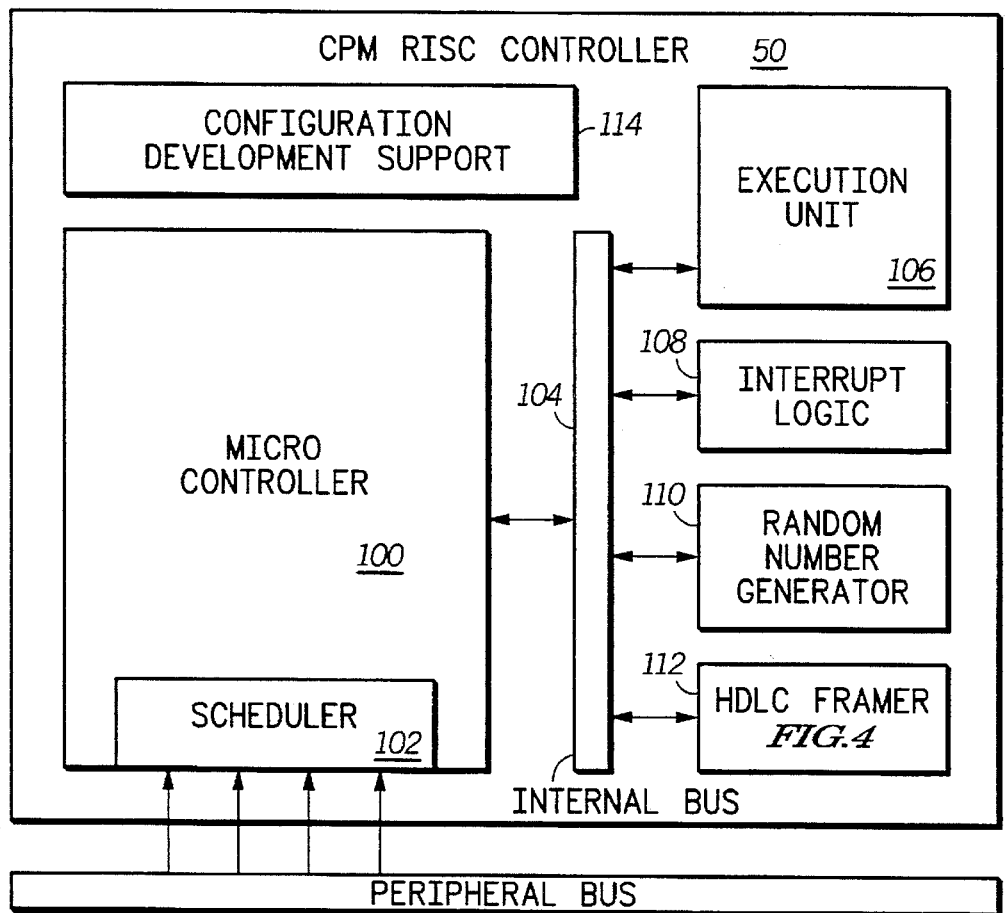
FIG. 3 is a block diagram showing the main components of an implementation of a CPM RISC Controller shown in FIG. 2.

FIG. 3 is a block diagram showing the main components of an implementation of a CPM RISC Controller 50. It contains a microcontroller 100 that includes a Scheduler 102. The microcontroller 100 is connected via an Internal Bus 104 to an Execution Unit 106, Interrupt Logic 108, a Random Number Generator 110, and a HDLC Framer 112. The CPM RISC Controller 50 also includes a Configuration and Development Support module 114. The microcontroller 100 and Scheduler 102 communicate with the I/O modules of the CPM 24 over a peripheral Bus 54.

Figure 4:
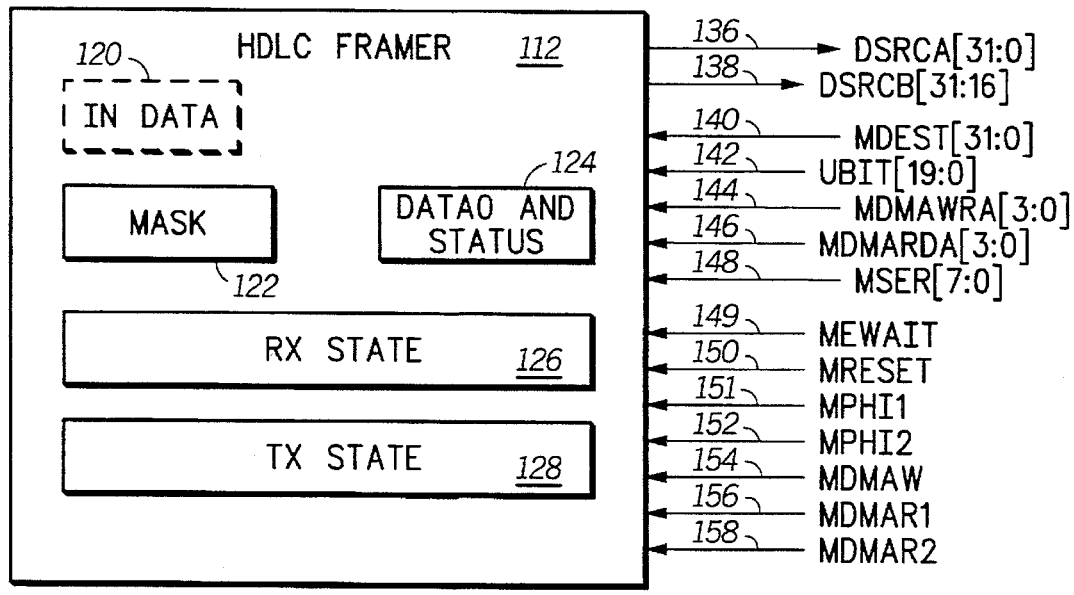
FIG. 4 is a block diagram showing the major components of the HDLC Framer module shown in FIG. 3.

FIG. 4 is a block diagram showing the major components of the HDLC Framer module 112 shown in FIG. 3. HDLC framing encodes raw data into HDLC format for transmission and decodes HDLC encoded receptions into raw data.

Data is transmitted or received from/to a SCC 60, 62, 64, 66 (FIG. 2) in transparent mode usually eight bits at a time. Each eight bits transmitted or received corresponds with a T1/E1 TDM timeslot. Thus, eight bits are transmitted or received for Time Slot 1, then eight bits for Time Slot 2 (see FIG. 23), etc. This cycle is repeated for each of the bytes received, each such byte received corresponding an eight bit time slot in a TDM frame.

The CPM Controller 20 deframes HDLC on a TDM line by receiving an eight bit byte as serial input. The CPM Controller then loads zero-deletion state (ZDSTATE) for the corresponding channel along with a mask (MASK) and the input byte into registers. The Framer 112 is then activated, which deletes the bit stuffed zeros (Zero Deletion) and recognizes HDLC flags. State (ZDSTATE) is then (re)saved in the corresponding channel table and if a byte of data has been deframed, it is stored in an Receive (Rx) buffer. This is then repeated for the next byte received as serial input, utilizing the channel table corresponding to the next timeslot.

HDLC framing is very similar. If output is available for a given channel, mask (MASK), zero-insertion state (ZISTATE) and possibly an output data byte are loaded from tables associated with the channel into special registers. The Framer 112 is then activated. It performs masking and zero-insertion. When the Framer 112 completes, after eight bits of output data have been generated, the CPM Controller 20 stores the zero-insertion state (ZISTATE) in the corresponding channel table, and the byte returned is transmitted serially over a communications line 28 utilizing a SSC 60, 62, 64, 66 and the Serial Interface 74. This is repeated for the channel corresponding to the next TDM timeslot.

The HDLC Framer 112 has a register containing Input Data 120, a Mask register 122, a Data Out and Status register 124, Receive (Rx) state 126, and Transmit (Tx) state 128.

FIG. 4 also shows the input and out-put signals received and generated by the HDLC Framer 112. These are listed along with the corresponding reference numbers ("Ref" column) in Table T-3. The HDLC Framer 112 is driven by two clocks, Φ1 and Φ2. The clock in which the various signals are active or valid is listed in the "Tim" column.

TABLE T-3

Framer Signals

| Signal(s) | Description | Tim | Ref |
|---|---|---|---|
| dscra | General Register Output Bus (Main register) | Φ1 | 136 |
| dscrb | General Register Output Bus (Other registers) | Φ1 | 138 |
| mdest | General Register Input Bus | Φ2 | 140 |
| ubit | Contains OPcode being executed | Φ1 | 142 |
| mdmawra | DMA space regs address for dscrb bus | Φ1 | 144 |
| mdmarda | DMS space regs address to dscra bus or mdest bus | Φ1 | 146 |
| mser | Bus supplying serial input to Framer | Φ1 | 148 |
| mewait | Wait, main has stopped execution | Φ1 | 149 |
| mreset | Main's reset signal | Φ2 | 150 |
| mphi1 | Clock Φ1 asserted | Φ1 | 151 |
| mhpi2 | Clock Φ2 asserted | Φ2 | 152 |
| mdmaw | DMA regs space write | Φ1 | 154 |
| mdmar1 | Read DMA into srca | Φ1 | 156 |
| mdmar2 | Read DAM into srcb | Φ1 | 158 |

Figure 5:
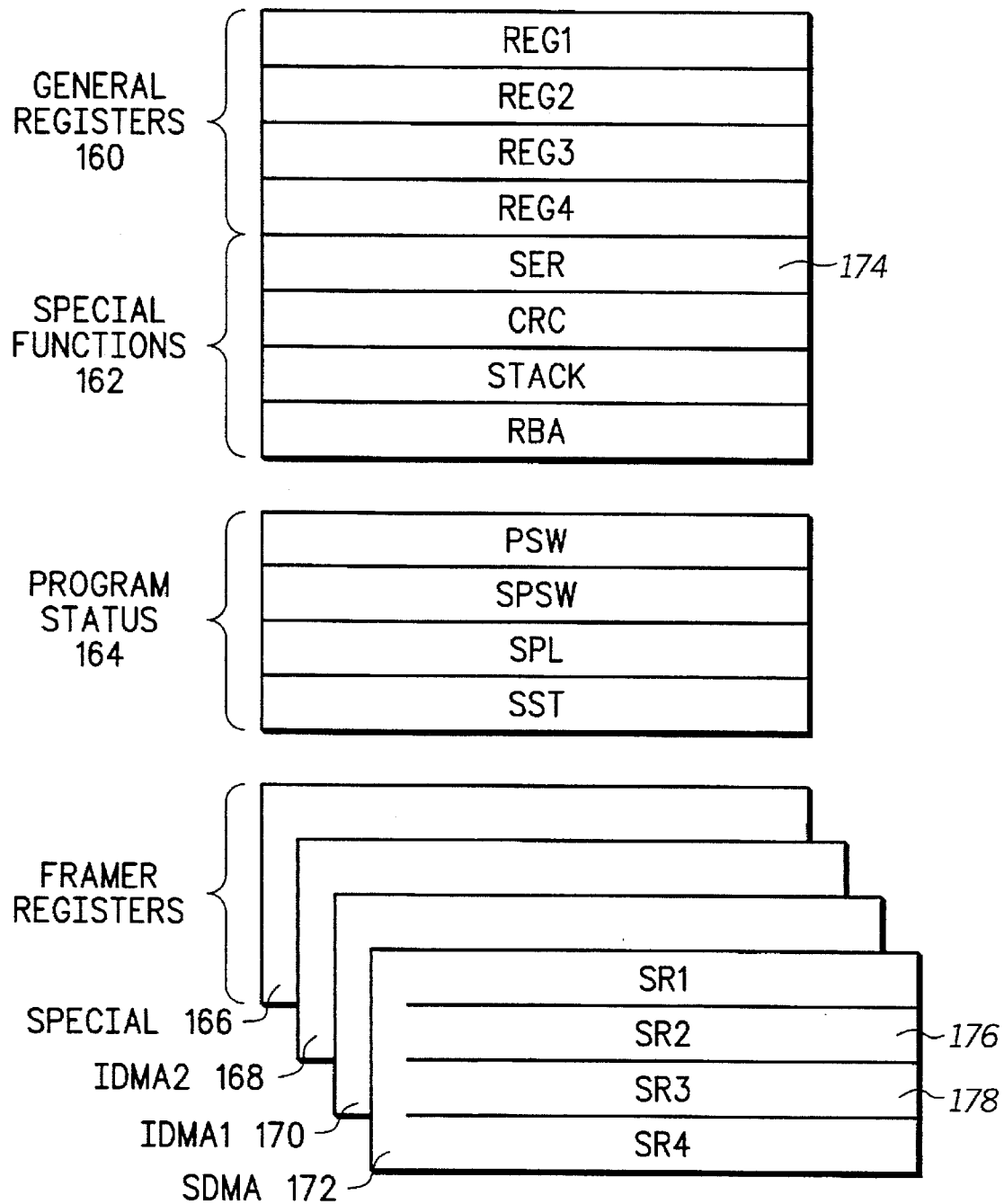
FIG. 5 shows the CPM register sets in accordance with the present invention.

FIG. 5 shows the CPM register sets. There are four main register sets used: a general register set 160, a Special Function register set 162, a Program Status register set 164, and a Dedicated register set. The Dedicated register set contains a plurality of overlapping register sets dedicated to various functions. Some of the Dedicated register sets are the Special Register set 166, IDMA1 register set 168, IDMA2 register set 170, and SDMA register set 172. The Framer 112 interacts with the SER register 174 in the Special Function Registers 162, and SR2 176 and SR3 178 in the Special Register Set 166.

Both the Transmit (Tx) and Receive (Rx) Framer 112 functions utilize the same set of registers to save silicon space. Table T-4 shows the information in each of the special registers before and after the Framer is invoked.

TABLE T-4

Framer Registers

| I/O | Time | SER (174) | SR2 (176) | SR3 (178) |
|---|---|---|---|---|
| Rx | Before | Data | Mask | ZDSTATE |
| Rx | After | | Data Out | ZDSTATE |
| Tx | Before | Data | Mask | ZISTATE |
| Tx | After | | Data Out | ZISTATE |

Figure 14:
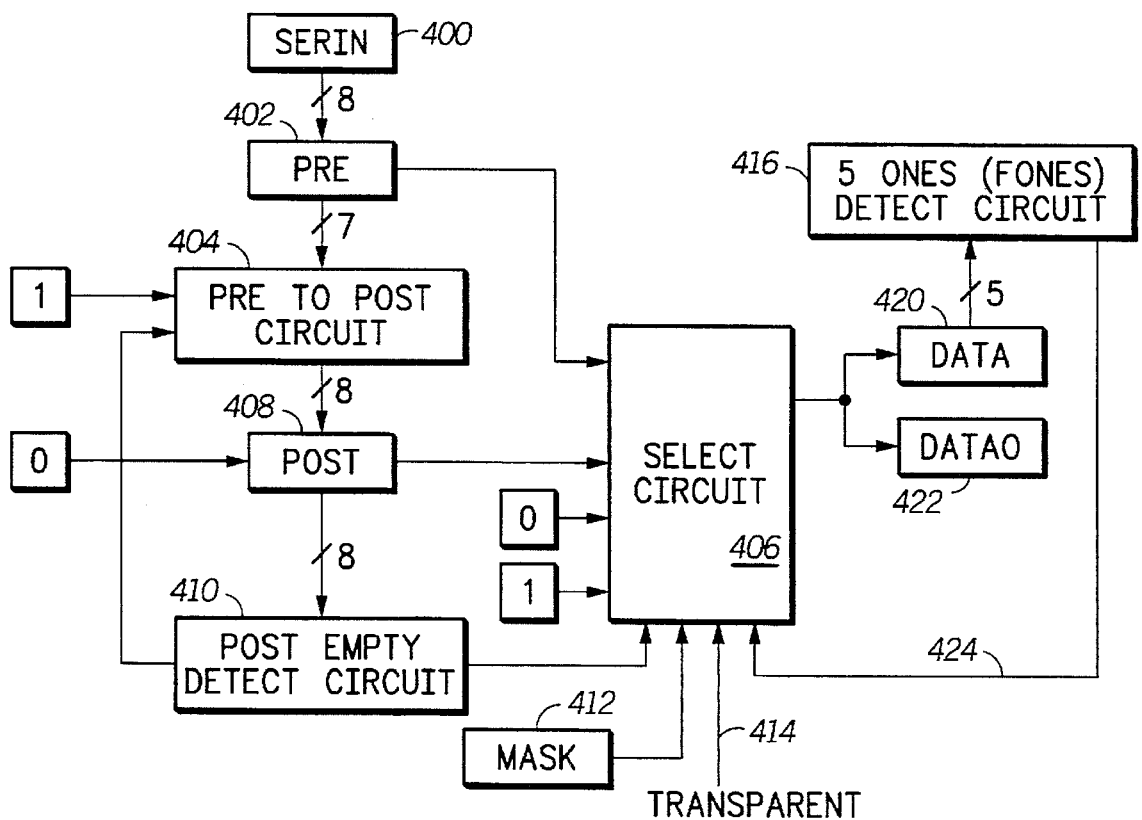
FIG. 14 is a circuit block diagram showing the primary blocks utilized in the preferred implementation of the Tx functionality in accordance with the present invention.

The SER register 174 is used to initialize the SERIN register 300 (FIG. 9), 400 (FIG. 14). It contains the eight bits of data to be operated upon by the Framer 112. The Framer 112 zero-inserts into this data for input (Rx) and zero-deletes for output (Tx).

The contents of the 32 bit Data Out Register in the SR2 register 176 is shown in Table T-5.

TABLE T-5

DATA OUT Register

| | 7 | 6 | 5 | 4 | 3 | 2 | 1 | 0 |
|---|---|---|---|---|---|---|---|---|
| 0 | | | DATAO (Data Out) | | | | | |
| 1 | Valid Data | In Frame | No Octet | Abort | Idle Stat | Idle Delta | Linf | Err |
| 2 | — | — | Mask (7:6) | | — | — | — | — |
| 3 | — | — | | | Mask (5:0) | | | |

Table T-6 contains a description of the Data Out Register fields:

TABLE T-6

| Field Name | Description |
|---|---|
| DATAO | Rx: FIFO to retain output data<br>Tx: accumulates processed bit stream |
| Valid Data | Rx: Data Out (DATAO) valid because of Zero deletion or masked bits |
| In Frame | Rx: machine is inframe |
| No Octet | Rx: Frame ended with non octet data. |
| Abort | Frame ended by an abort |
| Idle Stat | Rx: Idles detected in input stream |
| Idle Delta | Rx: Idle Stat changed |
| Linf | Rx: Asserted at inframe or no octet |
| Err | Rx: No Octet or Abort |
| Mask | Mask bits |

The DATAO 336 (FIG. 9), 422 (FIG. 14) byte contains the primary output of the Framer 112. The transmit function (Tx) does masking and zero insertion. In that case, DATAO will always contain an output byte. However, the receive function (Rx) does masking and zero deletion. In that case, not every activation of the Framer for input generates a byte in DATAO. The "Valid Data" flag is used to indicate whether DATAO contains a valid input byte.

The Mask 332 (FIG. 9), 412 (FIG. 14) is an 8 bit register used to ignore input bits or output bits. The noncontiguous format in the Data Out register matches the Mask bits in the Time Slot Assignment (TSA) table shown hereinbelow. Note that all of the fields in the Data Out register except for the Mask are output from the Framer. Thus, of the Data Out flags, only the Mask needs to be loaded into SR2 176 before activating the Framer 112.

The remainder of the Data Out register contains output status flags generated from operation of the Framer 112. As noted above, the "Valid Data" flag indicates whether or not DATAO contains valid input data after zero-deletion. The "In-Frame" flag identifies whether the Tx machine is inframe (see FIG. 10). The "No Octet" flag is used to indicate that an input HDLC frame did not result in an even multiple of eight bits after zero-deletion. The "Abort" flag indicates that an Abort flag sequence was detected. The "Idle Star" flag indicates whether an Idle was detected in the input stream. The "Idle Delta" flag indicates that the "Idle Stat" flag changed from the previous activation of the Framer. The "Linf" and "Err" flags indicate error conditions.

When the Framer 112 is activated, register SR3 178 contains the STATE of the zero-insertion (ZISTATE) machine or zero-deletion (ZDSTATE) state for the channel corresponding to the timeslot. The format of the 32 bit STATE Register is shown in Table T-7.

TABLE T-7

| STATE Register | | | | | | | |
|---|---|---|---|---|---|---|---|
| 1f | 18 | 17 | 10 | 0f | 08 | 07 | 00 |
| STATUS | | PRE | | POST | | DATA | |
| ⏐<br>V | ⏐<br>V | | | | | | |

| STATUS | | | | | | | |
|---|---|---|---|---|---|---|---|
| 1f | 1e | 1d | 1c | 1b | 1a | 19 | 18 |
| NW | Tm | Nm | Drp | Rm | Idle | INF | Dful |

Table T-8 contains the descriptions of the fields in the 32 bit STATUS register shown in Table T-7. The PRE 310 (FIG. 9), 402 (FIG. 14), POST 320 (FIG. 14), 408 (FIG. 14), and DATA 330 (FIG. 9), 420 (FIG. 14) fields are treated as individual registers in the Zero-Deletion machine (FIG. 9) and the Zero-Insertion Machine (FIG. 14).

TABLE T-8

STATUS Register Field Descriptions

| Field Name | Description |
|---|---|
| PRE | Rx: used to detect pre-delimiter conditions |
|  | Tx: input FIFO for incoming data |
| POST | Rx: used to detect post-delimiter conditions |
|  | Tx: loaded in \|\| with data from PRE |
| DATA | Rx: accumulate processed data |
|  | Tx: used to detect 5 consecutive "1" bits |
| STATUS | See below: |
| NW | 0 = Tx needs new input data |
| Tm | Current Tx data under process mode: |
|  | 0 = HDLC zero insertion |
|  | 1 = as is |
| Nm | New Tx data will be treated: |
|  | 0 = HDLC zero insertion |
|  | 1 = as is |
| Drp | At transparent Rx: drop first data valid |
| RM | Current Rx data under process mode: |
|  | 0 = HDLC zero insertion |
|  | 1 = as is |
| Idle | Current idle state of framer: |
|  | 1 = idle |
| INF | Rx machine in/out frame indication: |
|  | 0 = outframe |
|  | 1 = inframe |
| Dful | Rx Data register is full |

The Framer 112 is invoked utilizing a new instruction. The form of the instruction is:

frame{.t|.r}[.zid|.nzid]

The "t" indicates transmit (Tx) mode, the "r" indicates receive (Rx) mode, the "zid" indicates zero-insertion mode, and the "nzid" indicates no zero insert/delete. Note that the "zid" and "nzid" modes are only necessary when changing modes on a channel.

An example sequence for invoking the Framer 112 to process eight bits of input data corresponding to one T1/E1 code word/timeslot:

```
ld.h        sr2,Mask
ld.l        sr3,ZDSTATE
ld.b        ser,input_data
frame.r
nop
nop
nop
nop
nop
nop
nop
st.l        sr2,RSTATE
st.l        sr3,ZDSTATE
```

The ".l" extension to the load and store instruction indicates full word (32 bit), the ".h" indicates half word (16 bit), and the ".b" indicates byte (8 bit) operation.

Figure 6:
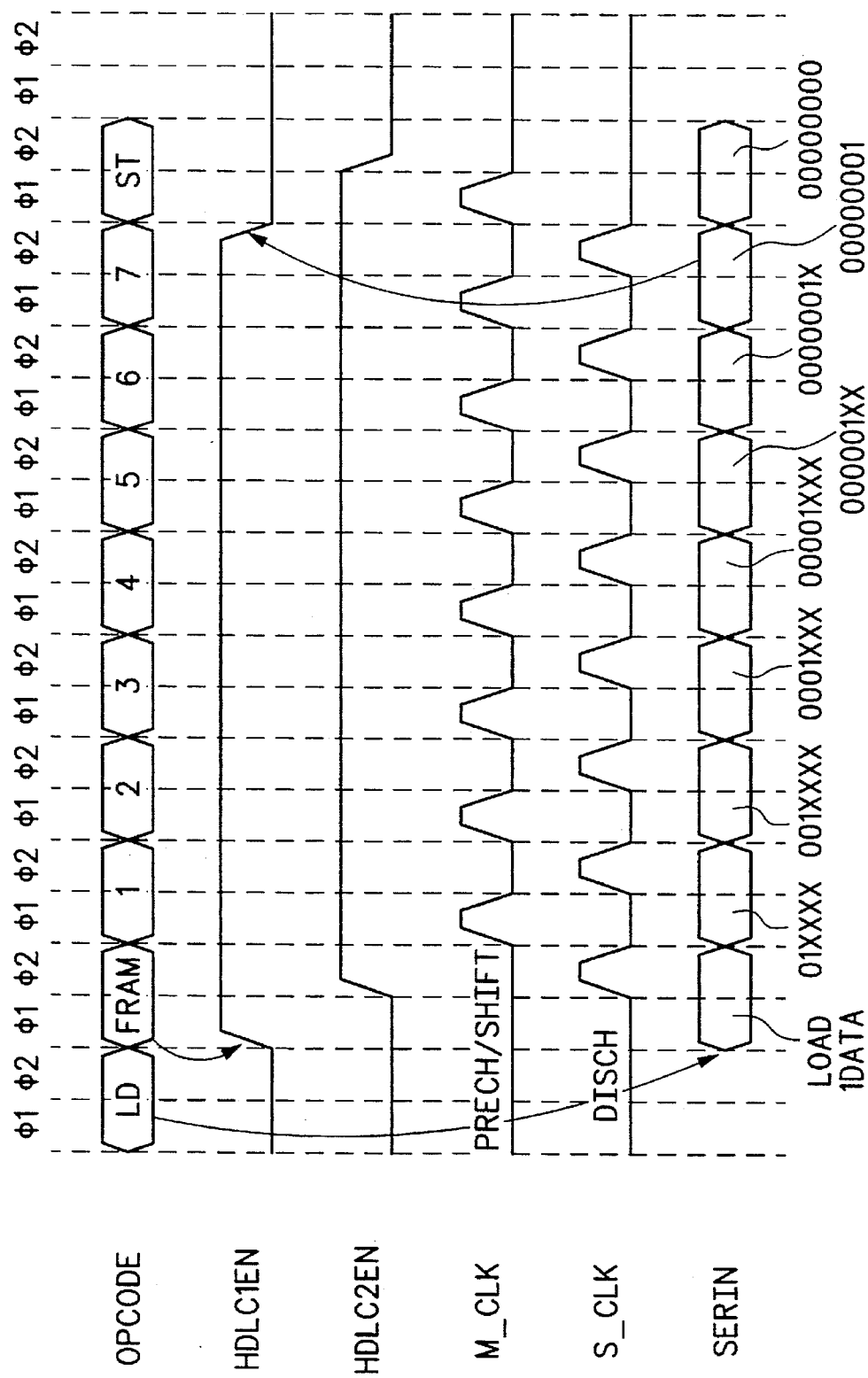
FIG. 6 is a timing diagram showing Framer timing in accordance with the present invention.

Note that the seven NOPs are for timing. Each Framer 112 activation consumes up to eight full clock cycles. Each of the full clock cycles has the Φ1 clock signal asserted followed by the Φ2 clock signal. Data is shifted in the Φ1 clock cycle, and tested in the Φ2 clock cycle. This is illustrated in FIG. 6. ZDSTATE and RSTATE are located in the Channel Tables (Table T-18). The Mask is retrieved from the Time Slot Assignment Table (TSA) (Table T-16).

FIG. 7 is a flow chaff showing invocation of the Framer 112 Receiver (Rx) function. A loop is entered starting with step 502. A check is made for more data in the input FIFO 56 (see FIG. 21), step 502. If no more data is present in the input FIFO 56, the loop is exited, step 504. Otherwise, the next logical channel is identified and its corresponding channel table is located, step 506. The HDLC Zero Deletion State (ZDSTATE) is loaded from the channel table, step 508, the mask is loaded into the MASK register (not shown), the next code word is loaded from the input FIFO 56 into the SERIN register, step 510, and the Framer 112 is invoked to Deframe the input data, step 512. After the Framer 112 completes operation, the HDLC Zero Deletion State (ZDSTATE) is stored back into the channel table, step 514. At this point, a check is made whether a deframed byte has been returned in register DATAO from the Framer 112, step 514. This is done by checking the Valid Data flag (see Table T-5) returned in the DATA Out register. If a byte has been returned in DATAO, step 514, it is stored as the next input byte in the channel input buffer, step 518. In any case, the loop is repeated until no more data is found in the input FIFO 56.

FIG. 8 is a flow chart showing invocation of the Framer 112 Transmitter (Tx) function. A loop is entered starting with step 522. If there is no more room in the output FIFO 58 (see FIG. 21), the loop is exited, step 524. Otherwise, the next logical channel is identified and its corresponding channel table is located, step 526. The HDLC Zero Insertion State (ZISTATE) is loaded from the channel table, step 528, and the mask is loaded into the MASK register (not shown). A check is made whether more HDLC data is required by the Zero Insertion Machine, step 530. This is done by testing the NW Zero Insertion State (ZISTATE) flag (see Table T-8). If output data is required, step 530, it is loaded from the channel output buffer into the SERIN register, step 532. In any case, the Framer 112 is invoked to Frame the output data, step 534. After the Framer 112 completes operation, the HDLC Zero Insertion State (ZISTATE) is stored back into the channel table, step 536, the framed code word is stored from the DATAO register as the next entry in the output FIFO buffer 58, step 538, and the loop is repeated until no more room is found in the FIFO 58.

Note that the operation of the RISC Controller 50 alternates between the Receive (Rx) loop shown in FIG. 7 and the Transmit (Tx) loop shown in FIG. 8, keeping the input FIFO 56 empty and the output FIFO 58 full. Other operations by the RISC Controller 50 can be intermixed as long as the output FIFO 58 is not allowed to become empty (underflow) and the input FIFO 56 is not allowed to become full (overflow).

The Framer 112 is further described in FIGS. 9–17. FIGS. 9–13 describe the Receiver (Rx) function, and FIGS. 14–17 describe the Transmitter (Tx) function.

Figure 9:
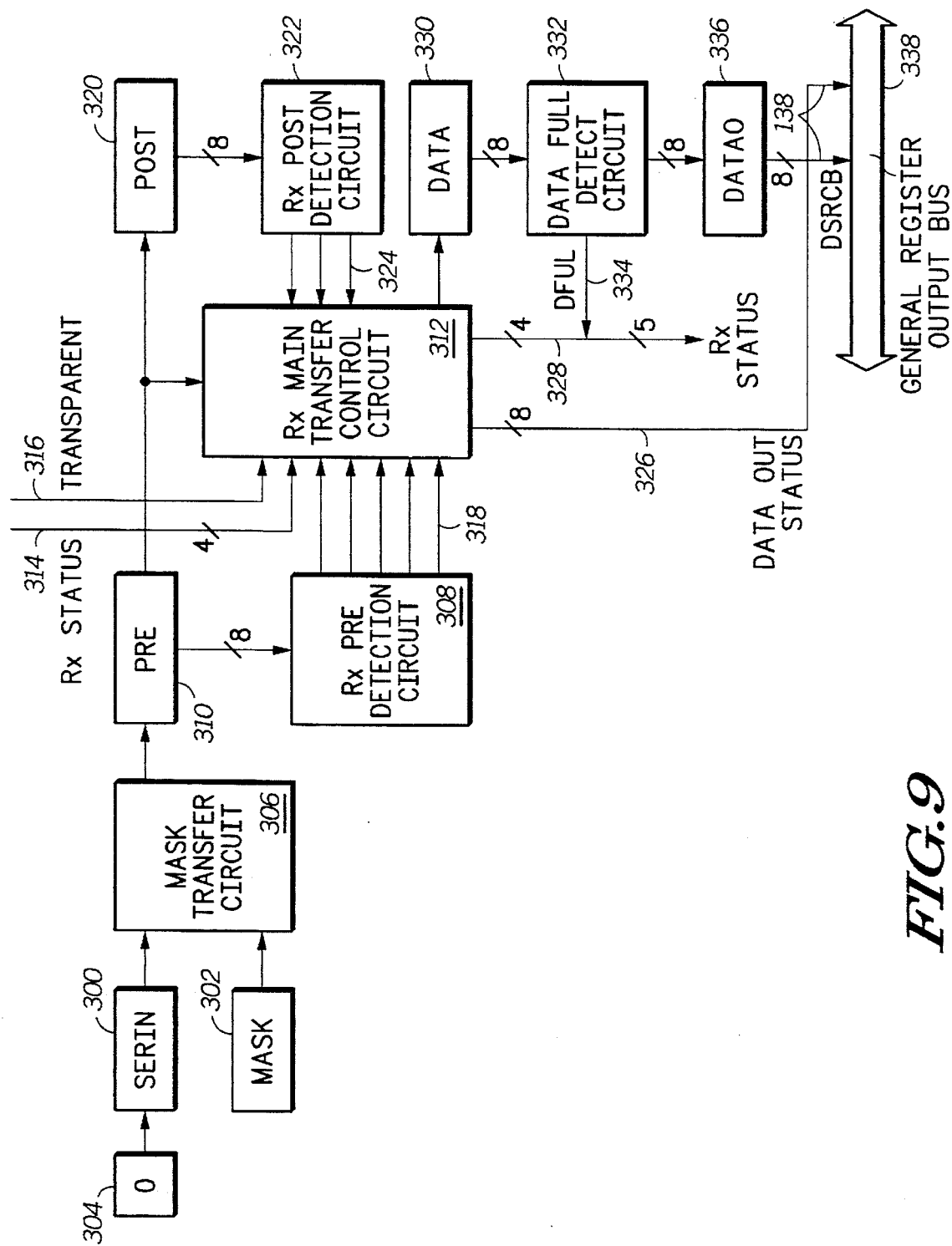
FIG. 9 is a block diagram showing the major components of the Receiver (Rx) function in accordance with the present invention.

FIG. 9 is a block diagram showing the major components of the Receiver (Rx) function. As shown above, eight bits of data to be processed are loaded in the SER register 174. This is copied into the SERIN register 300. At each major clock cycle, one bit is shifted out of the SERIN register 300, and is replaced with a zero bit 304. The bit shifted out of SERIN 300 is conditionally shifted into the PRE register 310. The conditional shifting is controlled by a Mask Transfer Circuit 306. The MASK register 302 is right shifted along side of the SERIN register 300. If a one ("1") bit is shifted out of the MASK register 302, the corresponding bit shifted out of the SERIN register 300 is shifted into the PRE register 310. Otherwise, the SERIN 300 bit is ignored.

Table T-9 shows the operation shifting bits out of SERIN 300 into PRE 310. Note that the MASK here is assumed to contain all one ('1') bits. Also note that in the example shown, instead of counting eight major clock cycles, the Framer 112 is stopped when a pattern of binary '00000001' has been shifted into SERIN 300.

TABLE T-9

Rx: SERIN => PRE

| 8 | 7 | 6 | 5 | 4 | 3 | 2 | 1 | 0 | To PRE | Status |
|---|---|---|---|---|---|---|---|---|---|---|
| 1 | a7 | a6 | a5 | a4 | a3 | a2 | a1 | a0 |    | at start |
| 0 | 1  | a7 | a6 | a5 | a4 | a3 | a2 | a1 | a0 | first shift |
| 0 | 0  | 1  | a7 | a6 | a5 | a4 | a3 | a2 | a1 |    |
| 0 | 0  | 0  | 1  | a7 | a6 | a5 | a4 | a3 | a2 |    |
| 0 | 0  | 0  | 0  | 1  | a7 | a6 | a5 | a4 | a3 |    |
| 0 | 0  | 0  | 0  | 0  | 1  | a7 | a6 | a5 | a4 |    |
| 0 | 0  | 0  | 0  | 0  | 0  | 1  | a7 | a6 | a5 |    |
| 0 | 0  | 0  | 0  | 0  | 0  | 0  | 1  | a7 | a6 | detect stop |
| 0 | 0  | 0  | 0  | 0  | 0  | 0  | 0  | 1  | a7 | stop |
| 1 | b7 | b6 | b5 | b4 | b3 | b2 | b1 | b0 |    | at start |
| 0 | 1  | b7 | b6 | b5 | b4 | b3 | b2 | b1 | b0 | first shift |
| 0 | 0  | 1  | b7 | b6 | b5 | b4 | b3 | b2 | b1 |    |
| 0 | 0  | 0  | 1  | b7 | b6 | b5 | b4 | b3 | b2 |    |

Table T-10 illustrates the operation transferring bits from SERIN to PRE 310 when the MASK 302 contains some zero bits.

TABLE T-10

Rx: SERIN => PRE with Mask

| 8 | 7 | 6 | 5 | 4 | 3 | 2 | 1 | 0 | Mask | To PRE |
|---|---|---|---|---|---|---|---|---|---|---|
| 1 | a7 | a6 | a5 | a4 | a3 | a2 | a1 | a0 |   |    |
| 0 | 1  | a7 | a6 | a5 | a4 | a3 | a2 | a1 | 1 | a0 |
| 0 | 0  | 1  | a7 | a6 | a5 | a4 | a3 | a2 | 1 | a1 |
| 0 | 0  | 0  | 1  | a7 | a6 | a5 | a4 | a3 | 0 | —  |
| 0 | 0  | 0  | 0  | 1  | a7 | a6 | a5 | a4 | 0 | —  |
| 0 | 0  | 0  | 0  | 0  | 1  | a7 | a6 | a5 | 1 | a4 |
| 0 | 0  | 0  | 0  | 0  | 0  | 1  | a7 | a6 | 1 | a5 |
| 0 | 0  | 0  | 0  | 0  | 0  | 0  | 1  | a7 | 0 | —  |
| 0 | 0  | 0  | 0  | 0  | 0  | 0  | 0  | 1  | 0 | —  |
| 1 | b7 | b6 | b5 | b4 | b3 | b2 | b1 | b0 |   |    |
| 0 | 1  | b7 | b6 | b5 | b4 | b3 | b2 | b1 | 1 | b0 |
| 0 | 0  | 1  | b7 | b6 | b5 | b4 | b3 | b2 | 1 | b1 |
| 0 | 0  | 0  | 1  | b7 | b6 | b5 | b4 | b3 | 0 | —  |

In the example above, after two complete Framer 112 activation, the PRE register 310 contains: b5,b4,b2,b1,a5,a4,a2,a1.

As bits are shifted into the left side of the PRE register 310, they are shifted out the right side into the POST register 320. Also, during each major clock cycle, the eight bits in the PRE register 310 are tested by PRE detection circuitry 308. The primary purpose of the PRE detection circuitry 308 is to identify flags. In a similar way, POST detection circuitry 322 tests the eight bits in the POST register 322 to identify flags. The flags tested in the PRE detection circuitry 308 and POST detection circuitry 322 are shown in Table T-11. Note that the "x" entries in the table indicate a "don't care" situation.

TABLE T-11

PRE & POST Delimiters

| at PRE | at POST | STATUS | Description |
|---|---|---|---|
| 1 1 1 1 1 1 1 1 | 1 1 1 1 1 1 1 x | IDLE | Idle |
| x x x x x x x x | 0 1 1 1 1 1 1 0 | OFLAG | Open flag |
| x 1 1 1 1 1 1 1 | x x x x x x x x | SFLAG | Shared Flag |
| 0 1 1 1 1 1 1 0 | x x x x x x x x | CFLAG | Close flag |
| x 1 1 1 1 1 1 1 | x x x x x x x x | ABORT | Abort |
| 1 1 1 1 1 1 1 x | x x x x x x x x | ABORT | Abort |
| x x x x x x x x | 1 1 1 1 1 x x x | FONES | Zero Delete |

Of special interest is the FONES (5 Ones) status and the OFLAG (Opening Flag) status. Inframe status 341 (FIG. 10) is not entered until OFLAG is detected in the POST detection circuitry 232. At this point, the next bit to be shifted out of the PRE register 310 is the first data bit in a frame. Five one bits (FONES) recognized by the POST detection circuitry 232 are used for zero insertion and deletion.

The five delimiters detected in the PRE detection circuitry 308 (IDLE, SFLAG, CFLAG, and two ABORTs) are the five signals 318 from the PRE detection circuitry to the Main Transfer Control Circuit 312. Likewise, the three delimiters detected in the POST detection circuitry 322 (IDLE, OFLAG, and FONES) are the three control signals 324 from the POST detection circuitry to the Main Transfer Control Circuit 312. The other control signals to the Main Transfer Control Circuit 312 are four of the Rx bits in the zero insertion state (ZISTATE) shown in Table T-7 (Drp, RM, Idle, Inf) plus a separate Transparent signal 316. This latter signal 316 is generated from the instruction OP code (see above) and is merged with the "RM" STATE signal.

The Rx Main Transfer Control Circuit 312 determines whether or not the bits shifted out of the PRE register 310 are shifted into the DATA register 330. The general function of the Circuit 312 is that the PRE 310 is shifted into the DATA register 330 if the Zero-Deletion machine is either in transparent mode, or is Inframe and not zero-deleting. Determination whether the machine is Inframe is according to the state diagram in FIG. 10. Zero deletion is triggered when Inframe and five ones are detected (FONES) by the POST detection circuit 322.

Figure 10:
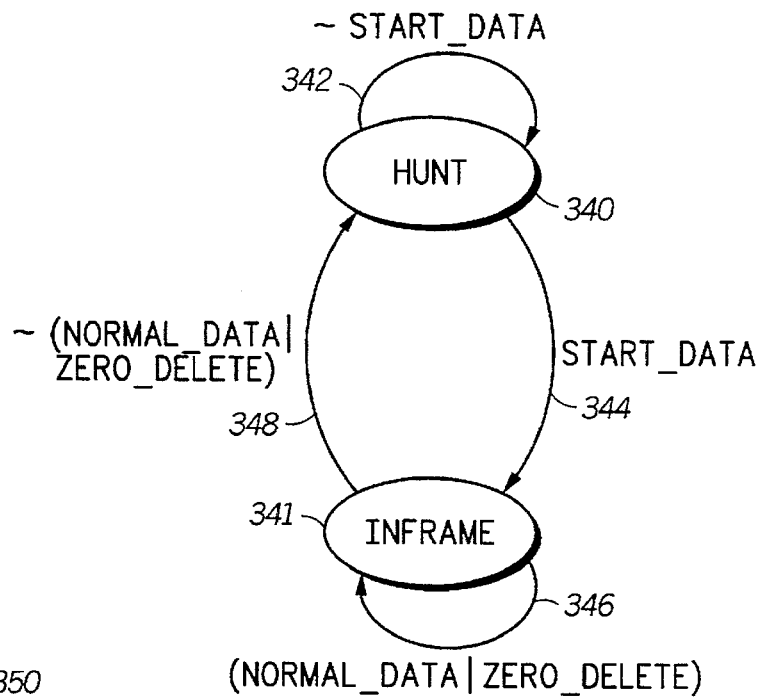
FIG. 10 is a state diagram showing the primary states and state transitions of the Zero-Deletion machine in accordance with the present invention.

The Rx Main Transfer Control Circuit 312 implements the FIG. 10 state machine. The location of the zero-deletion machine in this state machine is maintained by the same four STATE signals (Drp, RM, Idle, Inf). These STATUS flags are generated as signals 328 for ultimate storage back in the SR3 register 178. Also generated as signals are the eight Data Out status flags 326 (see Table T-5).

Bits are shifted from the PRE register 310 through the Main Transfer Control Circuit 312 into the DATA register 330. When the DATA Full Detect Circuit 332 detects that eight bits have been shifted into the DATA register 330, the eight bits are gated to the DATAO register 336. The DATA register is then reinitialized with to be binary "1000000". The "Dful" signal follows the Data Full status. This in turn is asserted whenever the one bit is shifted out of the DATA register 330. Table T-12 shows the operation of the shifting and gating.

TABLE T-12

Rx: PRE => DATA => DATAO

| PRE [0] | DATA[7:0] | | | | | | | | D F | Datao | Status |
|---|---|---|---|---|---|---|---|---|---|---|---|
| a7 | a6 | a5 | a4 | a3 | a2 | a1 | a0 | 1 | 0 | XXXX |  |
| b0 | a7 | a6 | a5 | a4 | a3 | a2 | a1 | a0 | 1 | XXXX | data full |
| b1 | b0 | 1 | 0 | 0 | 0 | 0 | 0 | 0 | 0 | A[7:0] | load datao |
| b2 | b1 | b0 | 1 | 0 | 0 | 0 | 0 | 0 | 0 | A[7:0] |  |
| b3 | b2 | b1 | b0 | 1 | 0 | 0 | 0 | 0 | 0 | A[7:0] |  |
| b4 | b3 | b2 | b1 | b0 | 1 | 0 | 0 | 0 | 0 | A[7:0] |  |
| b5 | b4 | b3 | b2 | b1 | b0 | 1 | 0 | 0 | 0 | A[7:0] |  |
| b6 | b5 | b4 | b3 | b2 | b1 | b0 | 1 | 0 | 0 | A[7:0] |  |
| b7 | b6 | b5 | b4 | b3 | b2 | b1 | b0 | 1 | 0 | A[7:0] |  |
| c0 | b7 | b6 | b5 | b4 | b3 | b2 | b1 | b0 | 1 | A[7:0] | data full |
| c1 | c0 | 1 | 0 | 0 | 0 | 0 | 0 | 0 | 0 | B[7:0] | load datao |
| c2 | c1 | c0 | 1 | 0 | 0 | 0 | 0 | 0 | 0 | B[7:0] |  |
| c3 | c2 | c1 | c0 | 1 | 0 | 0 | 0 | 0 | 0 | B[7:0] |  |

The current status of the Dful flag 334 is combined with the other four Rx STATE flags 328 to maintain the state of the Zero-Deletion Deframing machine. The signals will ultimately propagate back to the STATUS returned after Framer 112 activation in reg. SR3 178 (FIG. 5).

Returned in the upper half of register SR2 176 (FIG. 5) are the Data Out Status 326 (Table T-5) and the contents of the DATAO register 336 (Table T-5). The sixteen bits returned are placed on the General Register Bus 338 by asserting the appropriate DSRCB signals 138 (FIG. 4).

FIG. 10 is a state diagram showing the primary states and state transitions of the Zero-Deletion machine. The state machine is initialized in HUNT state 340. A Start_Data event will transition 344 to Inframe state 341. The machine stays in Inframe state 341 while either normal_data is encountered, or it is zero-deleting. When neither normal_data nor zero_delete substates are active, the machine will transition 348 back to HUNT state 340. The relevant variables are defined below. Their primary source are the delimiter status signals generated by the PRE Detection Circuit 308 and POST Detection Circuit (Table T-11).

start_data=(~inframe&oflag&~cflag&~sflag&~abort) ltrans normal_data=(inframe & ~cflag & ~sflag & ~abort) | trans zero_delete=inframe & fones & ~trans inflame=start_data lnormal_data l zero_delete The flags and fields in the above equations are further defined in Table T-13:

TABLE T-13

Zero-Deletion Machine Signals

| signal/status | Description |
| --- | --- |
| start_data | state signal - see above |
| normal_data | state signal - see above |
| zero_delete | state signal - see above |
| inframe | state signal - see above |
| oflag | OFLAG (Table T-11) Open Flag |
| cflag | CFLAG (Table T-11) Close Flag |
| sflag | SFLAG (Table T-11) Shared Flag |
| abort | ABORT (Table T-11) Abort |
| fones | FONES (Table T-11) Five Ones |
| trans | Transparent mode |

Figure 11:
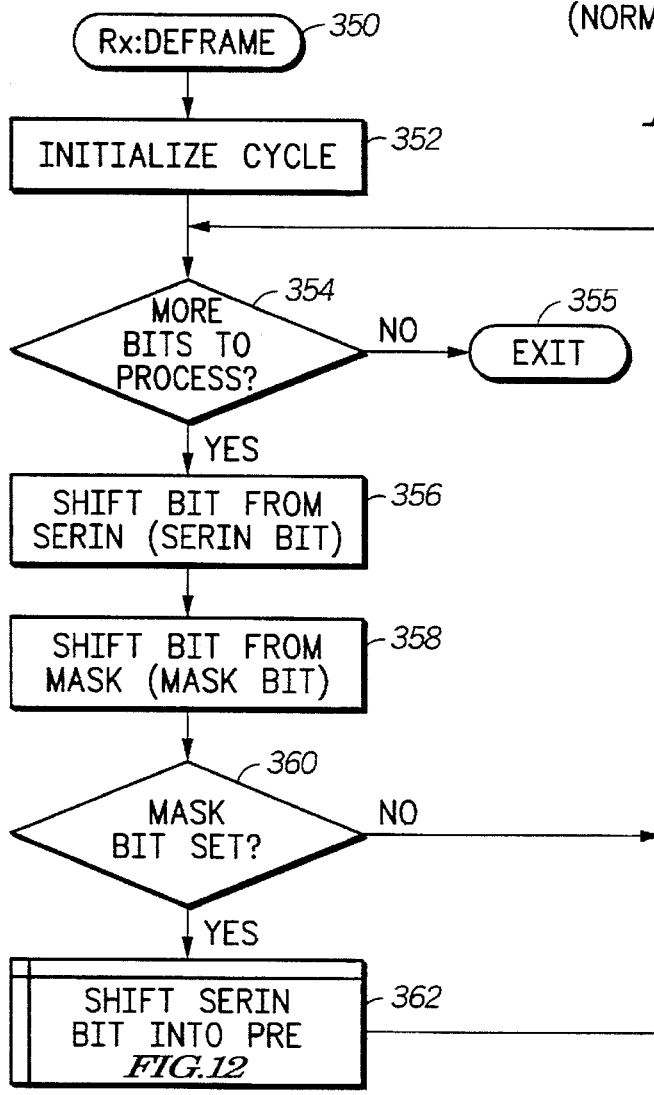
Figure 13:
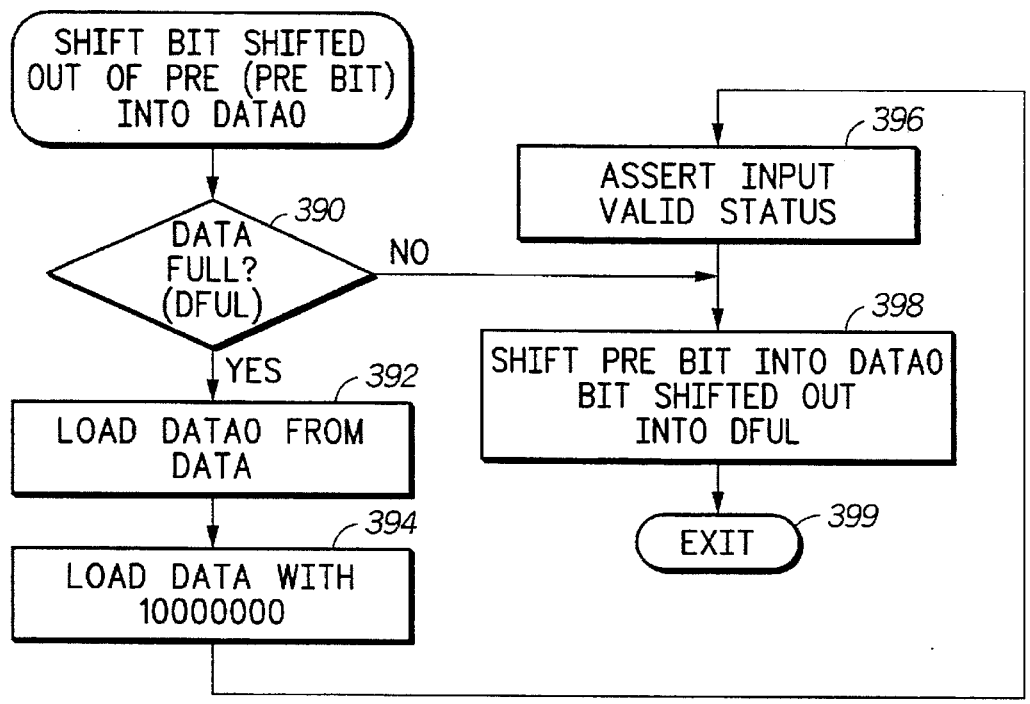

FIGS. 11–13 are flow charts showing a virtual implementation of the Deframer. The flow charts are included to show the interrelationships between and among the various components in FIG. 10.

FIG. 11 is a flowchart showing a virtual implementation of the high level logic in the Deframer. The Deframer is activated, step 350, by execution of the "frame.r" command. The Deframing is initialized, step 352. This comprises moving the SER register 174 (FIG. 5) into the SERIN register 300, and initializing a loop. The loop from step 354 to step 362 is executed eight times—one time for each bit in SERIN 300.

One implementation for controlling the loop is through usage of a counter. However, circuitry can be reduced by only loading the leftmost seven bits of SER 174 into the rightmost seven bits of SERIN 300, initializing the leftmost bit of SERIN 300 to zero, and treating the remaining bit of SER 174 as if it had been shifted out of SERIN 300. Then, whenever a bit is shifted out of SERIN 300, a zero bit is shifted in on the other end. The looping is terminated, halting the Framer 112, when SERIN 300 contains binary '00000001'. This indicates that all of the bits from SER 174 have been shifted out of SERIN 300. This progression is shown in Table T-9.

The loop is entered by first checking whether there are more bits to process, step 354. If this is done by checking for '00000001' in SERIN 300 as described above, the test is efficiently performed in circuitry using an eight input NAND gate that has one input bit inverted. If there are no more bits to process, step 354, the Deframer is exited, step 355. At this point, the Data Out bits are sent to SR2 176 and the five updated Rx Status bits 328 along the three Tx status bits, PRE 310, POST 320, and DATA 330 registers to the SR3 register 178.

Otherwise, one bit (the "SERIN" bit) is shifted from SERIN 300, step 356. A bit (the "MASK" bit) is simultaneously shifted from the MASK register 302, step 358. If the MASK bit is set, step 360, the SERIN bit is shifted into the PRE register 310, step 362 (see FIG. 12). In either case, the loop starting at step 354 is repeated.

FIG. 12 is a flow chart showing the virtual operation of the Shifting the SERIN bit into the PRE register 310, which is step 362 in FIG. 11. First, the SERIN bit is shifted in the PRE register 310. The bit (the "PRE bit") shifted out of the PRE register 310 is shifted into the POST register 320, step 364. Then the PRE register 310 and the POST register 320 are compared for matching with various delimiters, step 366. This is the functionality implemented in the PRE Detection Circuit 308 (FIG. 9) and the POST Detection Circuit 322 (FIG. 9). The definitions of the delimiters checked are shown in Table T-11. Note that "x" entries are "don't cares" and that more than one test may succeed, resulting in the assertion of more than one signal.

First, a check is made for an IDLE, step 368. If an IDLE was found, an IDLE signal is asserted, step 369. Next, a check is made for an Open Flag in POST 320, step 370. If found, the OPEN is processed, step 317, resulting in the assertion of an "OPEN" signal. A check is then made for a Shared Flag (SFLAG), step 372. If found, the SFLAG is processed, step 372, resulting in the assertion of a SFLAG signal, step 373.

A check is made for Closing Flags (CFLAG), step 374. If the CFLAG pattern is found, step 374, it is processed, step 375, resulting in an assertion of the CFLAG signal. A check is made for an Abort flag (ABORT), step 376. If the ABORT pattern is identified, it is processed, step 377, resulting in an assertion of an ABORT flag. Finally, a check is made for five ones (FONES) in the POST register 320, step 378. If the five one bits are detected, step 378, the FONES pattern is processed, step 379, resulting in an assertion of a FONES signal.

Checks are then made whether in Transparent mode, step 380, whether Inframe, step 382, and whether in Zero Delete state, step 384. Zero Delete state is entered when five ones are detected in the POST register 320, step 379, followed by a zero bit sifted out of PRE 310. If in transparent mode, step 380, or in Inframe Mode, step 382, and not in Zero Delete mode, step 384, the PRE bit is shifted into DATAO, step 386 (see FIG. 13 for more detail). In any case, the Shift SERIN bit into PRE function is exited, step 388, iterating back to step 354 in FIG. 11.

FIG. 13 is a flow chart showing more detail for the Shift SERIN bit into PRE function, step 362 in FIG. 12. A check is made whether the Dful flag is set, step 390. If not set, steps 392 through 396 are skipped. Otherwise, the DATAO register 336 is loaded from the DATA register 330, step 392. The DATA register 330 is loaded with binary '10000000', step 394, and an Input Valid status is latched as a one, status 396.

In any case, the PRE bit is shifted into the DATA register 330, and the bit shifted out of the DATA register 300 is placed in Dful, step 398, and the function exits, 399, returning back to FIG. 12.

A closer examination of the interaction between the DATA register 330 and the Dful flag may be in order. It can be seen that the purpose of initializing DATA 330 with '10000000' is so that the first seven times that a bit is shifted out of DATA 330 and into Dful, it will be a zero bit. On the eight shift, the one bit is shifted into Dful, indicating that the DATA register 330 contains eight valid data bits. This progression can be followed in Table T-12.

The order of the steps shown in FIGS. 11–13 were shown for clarity. It is expected that other orderings may result in more efficient execution. For example, in FIG. 13 instead of loading DATA 330 with '1000000', step 394, then shifting one of these bits into Dful, step 398, Dful can be set to zero, and DATA set to 'x1000000' where the 'x' bit is the PRE bit.

FIG. 14–17 shown the operation of the Framing Transmit (Tx) functionality. FIG. 14 is a circuit block diagram showing the primary blocks utilized in the preferred implementation of the Tx functionality.

In the Framer Receive (Rx) implementation discussed above, the Framer was input driven—the Framer 112 processes exactly eight input bits, generating between zero and eight output bits. Zero deletion, framing, and masking all contribute to the reduction in output bits compared with input bits. But since output has to be in multiples of the byte size (8), some Framer 112 activations do not result in output.

This relationship is reversed in the Framer Transmit (Tx) implementation—the Framer 112 generates exactly eight output bits every time it is activated. These eight output bits are generated from zero to eight input bits. This increase in the number of bits generated from the number of input bits is a primarily a result of zero insertion. As the number of input bits for each activation must be a multiple of the byte size (8), not every activation of the Framer 112 requires an input byte.

The other ramification of this is that the Framer Tx functionality is output driven. For that reason, the circuit will be discussed from the output side back to the input side, instead of the other way around as was done for the Rx portion of the Framer 112 functionality.

Eight bits are shifted through the Select Circuit 406 into the DATA 420 and DATAO 422 registers. The DATAO register 422 contains the Framer 112 output returned in register SR2 176. The DATA register 420 maintains a history of bits shifted out through the Select Circuit 406 across different iterations and Framer 112 activations. One reason to maintain this history is to identify five one bits (FONES) in a row 416. This signal is one of the input signals to the Select Circuit 406, directing the Select Circuit 406 to supply a zero for zero insertion as the next bit shifted into DATA 420 and DATAO 422, unless in transparent mode.

Terminating the Framer Tx function is done when eight bits have been shifted into DATA 420 and DATAO 422. One implementation is to utilize a counter. The preferred implementation due to the amount of circuitry required is to initialize DATAO 422 to binary '10000000' when the Framer 112 is activated. Then each bit of DATAO 422 is checked as it is shifted out and a bit is shifted in from the Select Circuit 406. When the 'one' bit is shifted out of DATAO 422, eight bits have been shifted in, and the Framer 112 terminates. Note also that during initialization, if the "NW" flag is set, the PRE register 402 is initially loaded with the eight bits in the SERIN register 400.

The Select Circuit 406 can be viewed as having four control inputs: FONES detect 424, Transparent mode 414, a MASK bit 412, and the POST register empty circuit 410, and four data inputs: a bit shifted out of the PRE register 402, a bit shifted out of the POST register 408, a constant '1', and a constant '0'.

As noted above, if not in transparent mode (i.e. the Transparent signal 414 is not asserted), and FONES (5 ones) are detected 416, a zero is output from the Select Circuit. In any case, a bit is shifted out of the MASK register 412. If the MASK register 412 bit is not set, a constant one ('1') bit is output from the Select circuit 406. Otherwise, a bit is either shifted out of PRE 402 or POST 408 depending on the status asserted by the POST empty detect circuit 410.

Table T-14 shows the operation of shifting bits out of the POST register 408 at the direction of the Select Circuit 406 and into the DATAO register 422.

TABLE T-14

Tx: POST => DATAO

| 7 | 6 | 5 | 4 | 3 | 2 | 1 | 0 | To datao | Status |
|---|---|---|---|---|---|---|---|----------|--------|
| 0 | 0 | 0 | 0 | 0 | 0 | 1 | e7 | e6 | |
| 0 | 0 | 0 | 0 | 0 | 0 | 0 | 1 | e7 | empty_post |
| 1 | d7 | d6 | d5 | d4 | d3 | d2 | d1 | d0 | load_post |
| 0 | 1 | d7 | d6 | d5 | d4 | d3 | d2 | d1 | |
| 0 | 0 | 1 | d7 | d6 | d5 | d4 | d3 | d2 | |
| 0 | 0 | 0 | 1 | d7 | d6 | d5 | d4 | d3 | |
| 0 | 0 | 0 | 0 | 1 | d7 | d6 | d5 | d4 | |
| 0 | 0 | 0 | 0 | 0 | 1 | d7 | d6 | d5 | |
| 0 | 0 | 0 | 0 | 0 | 0 | 1 | d7 | d6 | |
| 0 | 0 | 0 | 0 | 0 | 0 | 0 | 1 | d7 | empty_post |
| 1 | c7 | c6 | c5 | c4 | c3 | c2 | c1 | c0 | load_post |
| 0 | 1 | c7 | c6 | c5 | c4 | c3 | c2 | c1 | |
| 0 | 0 | 1 | c7 | c6 | c5 | c4 | c3 | c2 | |

When a binary '00000001' is detected in the POST register 408 by the POST empty detect circuit 410, the empty_post signal is asserted. On the next shift cycle (Φ1), when output is requested from PRE 402 or POST 408, the load_post signal is asserted. In response to the load_post signal, the seven leftmost bits of the PRE register 402 are loaded into the rightmost seven bits of the POST register 408 by the PRE to POST circuit 404, while the left most bit in the POST register 408 is loaded with a one ('1') bit. The fight most bit off the PRE register 402 is sent to the DATAO register 422. The remainder of the time when a bit is requested by the Select Circuit 406, it is shifted out of the POST register 408, and a zero ('0') bit is shifted in to replace it.

Figure 15:
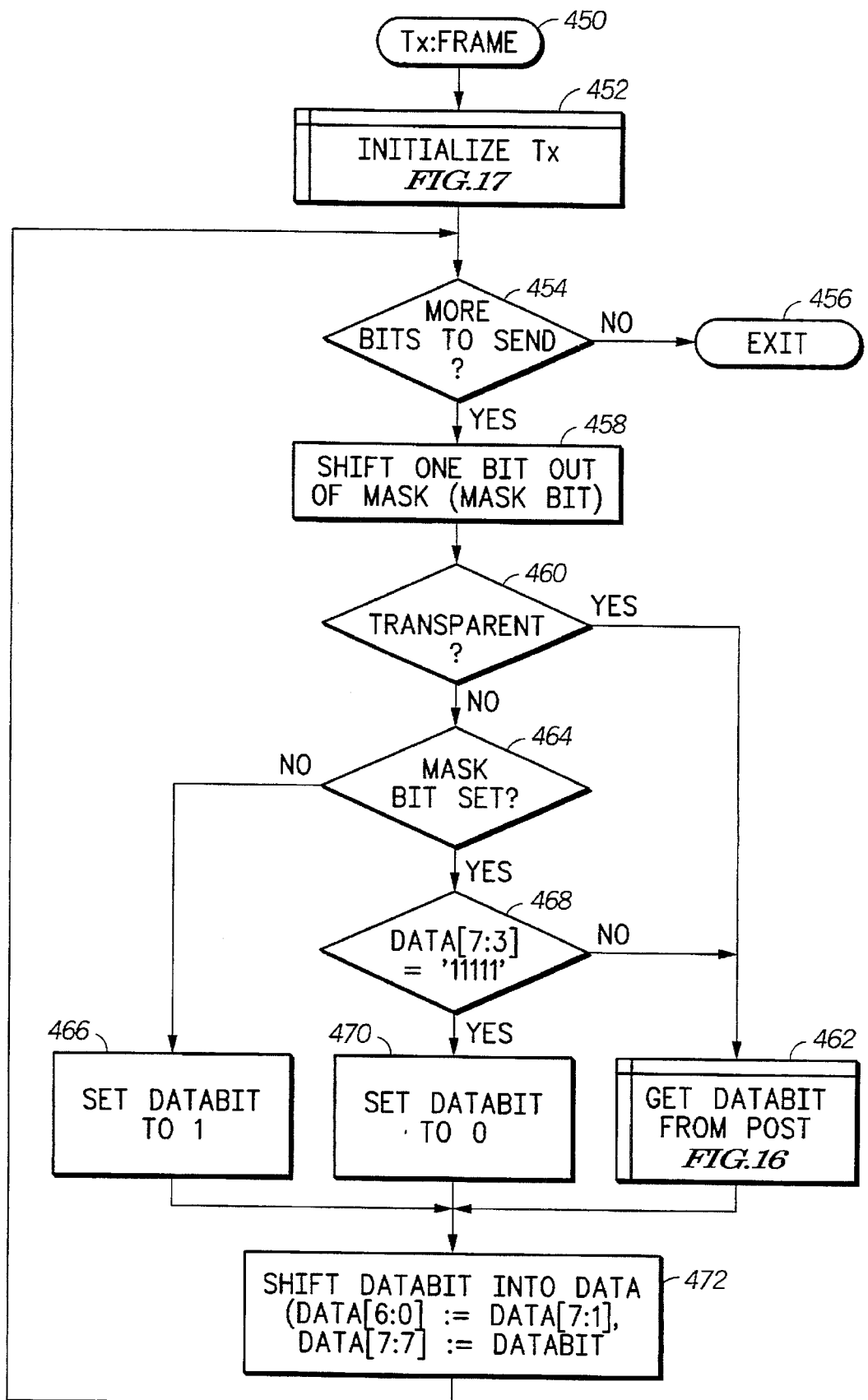
FIGS. 15 through 17 are flow charts showing a virtual implementation of the Framer Transmit (Tx) function in accordance with the present invention.
Figure 16:
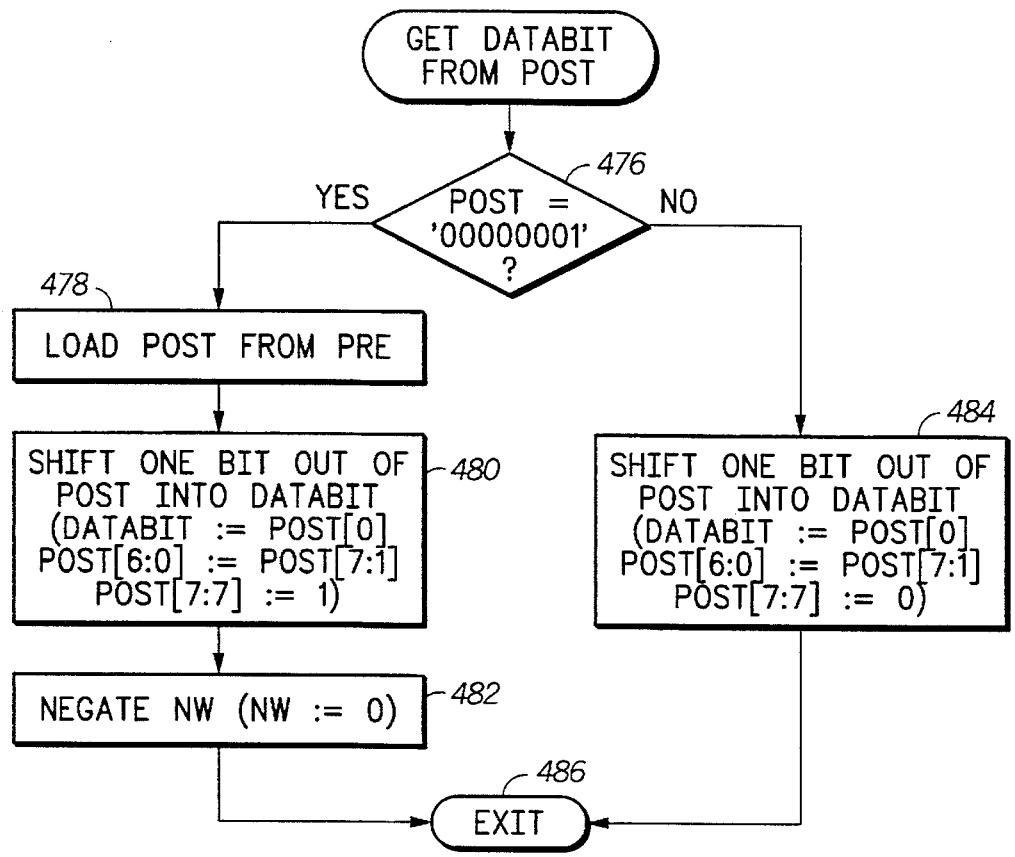
Figure 17:
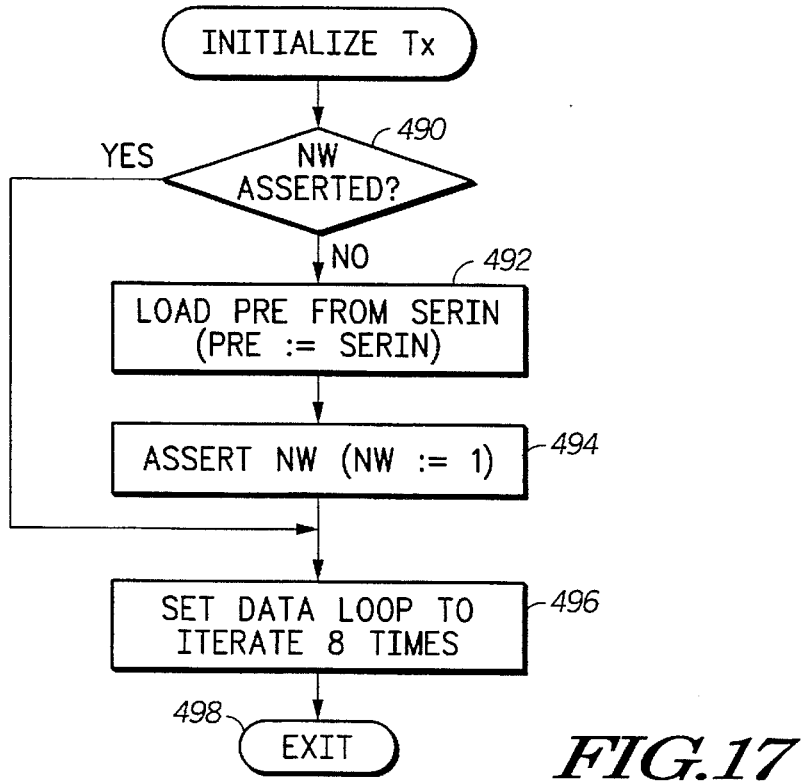

FIGS. 15 through 17 are flow charts showing a virtual implementation of the Framer 112 Transmit (Tx) function. FIG. 15 shows the high level functionality. The Framer is activated, step 450, and the Tx function initializes 452 (see FIG. 17). A loop is entered and a check is made whether more bits need to be processed, step 454. If no more bits are needed, step 454, the Framer 112 terminates, step 456. Otherwise, one bit ("Masked bit") is shifted out of the MASK register 412, step 458. A check is made whether in transparent mode, step 460. If in Transparent mode, step 480, a Databit is extracted from the POST register, step 462 (see FIG. 16). Otherwise, the Masked bit is checked. If it is set, the Databit is set to a constant one ("1"), step 466. Otherwise, the DATA register 420 is checked using the FONES detect circuit 416 for five one bits, step 468. If five one bits were detected, step 468, zero insertion is required, and Databit is set to zero ("0"). Otherwise, if the Masked Bit is set, step 464, and FONES is not set, step 466, a Databit is extracted from the POST register, step 462 (see FIG. 16). Regardless of the paths taken above, the Databit is shifted into both the DATA register 420 and the DATAO register 422. Finally, the loop iterates, starting With the test of more bits to send, step 454.

FIG. 16 is a flow chart showing the operation of the Get Databit from POST functionality shown in step 462 of FIG. 15. A check is made by the POST empty detect circuit 410 for binary '00000001' in the POST register 408, step 476. The '00000001' value indicates that the POST register 408 is empty. In that case, POST 408 is loaded from PRE 402, step 478, one bit is then shifted out of POST to be used as the Databit and the bit shifted out of POST 408 is replaced by a one ('1') bit shifted in, step 480. Finally, the "NW" flag is negated, step 482, indicating that a new output word of data is required for the next Framer 112 activation. On the other hand, when the POST register 408 contains other than '00000001', one bit is shifted out of the POST register 408 to be used as the Databit, step 484. This Databit is replaced in the POST register 408 by a zero ("0") bit shifted in. In any case, the function returns, step 486 to FIG. 15.

FIG. 17 is a flow chart showing how the Transmit (Tx) Framer functionality is initialized. The "NW" flag is tested, step 490. If "NW" is not asserted, step 490, the PRE register 402 is loaded from the SERIN register, step 492 and the "NW" flag is latched to a one ("1") status, step 494. In any case, the DATA loop is initialized to iterate eight times, step 496, and the functionality exits to back to FIG. 15, step 498.

Figure 18:
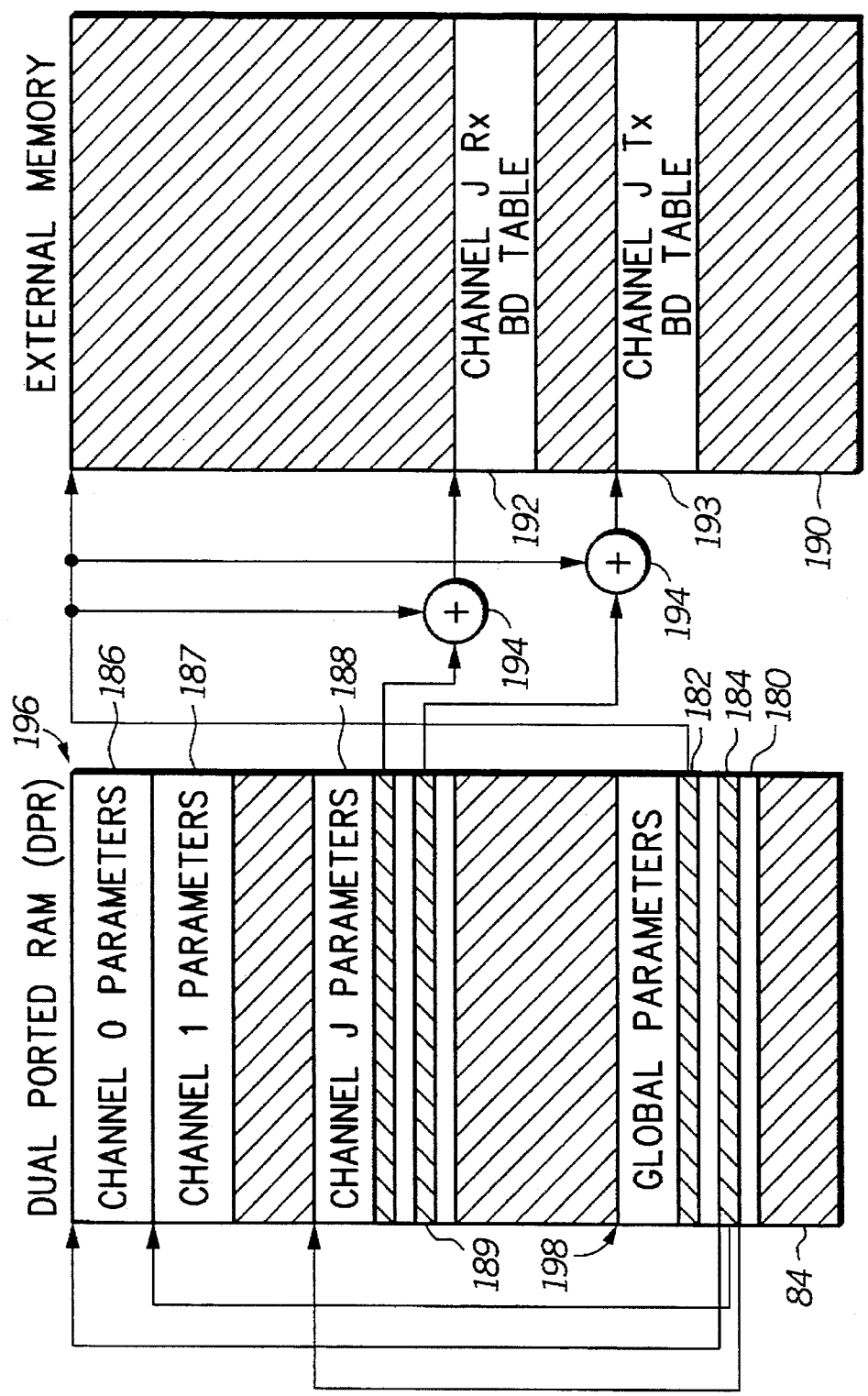
FIG. 18 shows a memory map of the Dual Ported RAM (DPR) and External Memory utilized by the CPM to control the Framer in accordance with the present invention.

Returning to the discussion of the CPM 24 components, FIG. 18 shows a memory map of the Dual Ported RAM (DPR) 84 and External Memory 190 utilized by the CPM 24 to control the Framer 112. The base table in DPR 84 is the Global Parameter Table 180 that always starts at a fixed location 198 in DPR 84. The table entries and their definitions are shown in Table T-15.

TABLE T-15

Global Parameter Table

| Adr | Len | Name | Description |
|---|---|---|---|
| 00 | 04 | MCBASE | Multichannel base pointer |
| 04 | 02 | QMCSTATE | Multichannel controller state |
| 06 | 02 | MRBLR | Maximum receive buffer length |
| 08 | 02 | Tx_S_PTR | TSATTx pointer |
| 0a | 02 | RxPTR | Current TSATRx time slot entry |
| 0c | 02 | GRFTHR | Global Receive frame threshold |
| 0e | 02 | GRFCNT | Global receive frame count |
| 10 | 04 | INTBASE | Multichannel Interrupt table base address |
| 14 | 04 | INTPTR | Current interrupt queue pointer (INTBASE) |
| 18 | 02 | Rx_S_PTR | TSATRx pointer |
| 1a | 02 | TxPTR | Current TSATTx time slot entry |
| 1c | 02 | C_MASK32 | CRC Constant (debb20e3) |
| 20 | 40 | TSATRx | Time slot assignment table - Rx |
| 60 | 40 | TSATTx | Time slot assignment table - Tx |
| a0 | 04 | C_MASK16 | CRC Constant (f0b8) |
| a4 | 04 | TEMP_RBA | |
| a8 | 08 | TEMP_CRC | |

Table T-16 shows a Time Slot Assignment (TSA) table. The Global Parameter Table contains two such tables: a Receive Time Slot Assignment Table (TSATRx) and a Transmit Time Slot Assignment Table (TSATTx). Each of the two TSA tables consists of thirty-two sixteen bit entries. Note though that access to the TSA tables is indirect via the Tx_S_PTR and Rx_S_PTR pointers. This provides a mechanism for sharing the tables between Transmit (Tx) and Receive(Rx) functions.

TABLE T-16

Time Slot Assignment Table

| | 0f | 0e | 0d 0c | 0b | 0a 09 08 07 06 | 05 04 03 02 01 00 |
|---|---|---|---|---|---|---|
| 00 | V | W | M(7:6) | 0 | Channel Pointer | Mask (5:0) |
| 01 | V | W | M(7:6) | 0 | Channel Pointer | Mask (5:0) |
| 02 | V | W | M(7:6) | 0 | Channel Pointer | Mask (5:0) |
| 1e | V | W | M(7:6) | 0 | Channel Pointer | Mask (5:0) |
| 1f | V | W | M(7:6) | 0 | Channel Pointer | Mask (5:0) |

Table T-17 contains definitions for the Time Slot Assignment (TSA) Table fields. In the case of TDM, the TSA Table is scanned once for each cycle. For example, in the case of a T1 transmission, a cycle starts when a sync signal is received (see L1SYNC 204 in FIG. 23). Idles are transmitted if the Valid Bit (V) for a channel is not set. Eight bits of either data or idle are transmitted for each channel until a Wrap (W) flag is encountered. The remainder of the channels, if any, are ignored until the next sync signal is received. The RxPTR and TxPTR Global Table entries point at the TSA entries currently being processed.

TABLE T-17

| Field Name | Description |
|---|---|
| V | Valid bit |
| | 0 = data in this time slot totally ignored |
| | 1 = data in time slot read/written |
| W | Wrap |
| | 0 = not last time slot in table |
| | 1 = the last time slot in table |
| Mask (7:6) | top two bits of mask |
| Channel Pointer | channel number (0–31) used to index into channel tables |
| Mask (5:0) | bottom six bits of mask. |

Each valid Time Slot Assignment (TSA) entry points to a Channel Specific Parameter (Channel) Table 186, 187, 188, in low DPR 84 memory. Note that multiple TSA entries may point at the same Channel Specific Parameter Table. This is done in two situations: when a channel simultaneously supports both input and output, and for Superchannels.

Indexing is done by multiplying the size of the Channel Specific Parameter Table (hex 40) by the Channel Pointer in the TSA entry and adding this product to a fixed base address 196. Preferably, the multiplication is optimized by appending six low order zeros to the Channel Pointer.

Table T-18 shows layout of the Channel Specific Parameter (Channel) Tables 186, 187, 188. Three Channel tables are shown: channel 0 186, channel 1 187 and channel j 188.

TABLE T-18

Channel Specific Parameter Table

| Adr | Len | Name | Description |
|---|---|---|---|
| 00 | 02 | TBASE | Tx Buffer Descriptor (BD) base address |
| 02 | 02 | CHAMR | Channel mode register |
| 04 | 04 | TSTATE | TX Internal State |
| 08 | 04 | | Tx Internal Data Pointer |
| 0c | 02 | TBPTR | Tx Buffer Descriptor Pointer |
| 0e | 0 | | Tx Internal Byte Count |
| 10 | 04 | TUPACK | Tx Temp - UnPack 4 bytes from 1 long |
| 14 | 04 | ZISTATE | Zero Insertion Machine State |
| 18 | 02 | TCRC | Temp Transmit CRC |
| 1c | 02 | INTMASK | Channel's interrupt mask flags |
| 1e | 02 | BDflags | Temp |
| 20 | 02 | RBASE | Rx Buffer Descriptors (BD) base address |
| 22 | 02 | TMRBLR | Maximum receive buffer length |
| 24 | 04 | RSTATE | Rx Internal State |
| 28 | 04 | | Rx Internal Data Pointer |
| 2c | 02 | RBPTR | Rx Buffer Descriptor Pointer |
| 2e | 02 | | Rx Internal Byte Count |
| 30 | 04 | RPACK | Rx Temp - packs 4 bytes to 1 long |
| 34 | 04 | ZDSTATE | Zero Deletion Machine State |
| 38 | 04 | RCRC | Temp receive CRC |
| 3c | 01 | TRNSYNC | Transparent synchronization (Superchannels) |
| 3e | 02 | TMP_MB | temp (min(MAX_cnt,Rx int. byte cnt)) |

The Channel Tables 186, 187, 188 contain a number of fields relevant to this disclosure. The CHAMR field contains the Channel Mode Register shown below in Table T-23. TSTATE and RSTATE contain the Transmit (Tx) state and the Receive (Rx) state, respectively, returned in SR2 176 from the latest Framer 112 activations. The contents of these fields are shown above in Table T-5. ZISTATE and ZDSTATE contain the Zero Insert machine STATE and the Zero Delete machine STATE furnished to and received from the Framer 112 in register SR3 178 when performing Zero Insertion and Zero Deletion. The contents of these fields are shown above in Table T-7. TRNSYNC is used to synchronize Superchannels. The high order byte contains the number of the first timeslot utilized when receiving, and the low order byte contains the number of the first timeslot utilized when transmitting.

The Channel Tables 186, 187, 188 also contain pointers 189 to Transmit Buffer Descriptor (BD) tables (TBASE) and receive BD tables (RBASE) for the channels. A Channel table will have both a transmit and a receive BD pointer if the corresponding channel supports both modes. In FIG. 18, both a Receive BD (RxBD) table 192, and a Transmit BD (TxBD) table 193 are shown for channel j 188. The base address of each BD table 192, 193 is computed by adding 194 the channel table pointers 189 to a BD table base address 182.

Table T-19 shows the layout of a Receive Buffer Descriptor (RxBD) table entry.

TABLE T-19

| | | | | | | RECEIVE BUFFER DESCRIPTOR (Rx BD) | | | | | | | | | |
|---|---|---|---|---|---|---|---|---|---|---|---|---|---|---|---|
| 0f | 0e | 0d | 0c | 0b | 0a | 09 | 08 | 07 | 06 | 05 | 04 | 03 | 02 | 01 | 00 |
| 0 E | — | W | I | L | F | CM | — | UB | — | LG | NO | AB | CR | — | — |
| 2 | | | | | | Data Length | | | | | | | | | |
| 4 | | | | | | | | | | | | | | | |
| 6 | | | | | | Rx Data Buffer Pointer | | | | | | | | | |

A Receive Buffer Descriptor (RxBD) table consists of one or more RxBD entries arranged sequentially in memory. The RxBD table is terminated with an entry that has its Wrap (W) flag set. The RBPTR pointer in the Channel table points at the current RxBD table entry. Table T-20 contains definitions of the RxBD table entry fields.

TABLE T-20

Receive Buffer Fields

| Field Name | Description |
|---|---|
| E | Empty |
| | 0 = data buffer has been filed or aborted |
| | 1 = data buffer associated with BD is empty |
| W | Wrap (final BD in Table) |
| | 0 = Not last buffer descriptor in BD table |
| | 1 = last buffer descriptor in BD table |
| I | Interrupt |
| | 0 = RXB is not set after buffer used |
| | 1 = RXB or RXF bit will be set when buffer has been used by HDLC controller |
| L | Last in Frame |
| | 0 = Buffer not last in a frame |
| | 1 = Buffer the last in a frame |
| F | First in Frame |
| | 0 = Buffer is not first in a frame |
| | 1 = Buffer is the first in a frame |
| CM | Continuous Mode |
| | 0 = Normal operation |
| | 1 = Empty bit not set by CP after BD closed allows buffer overwrite when next accessed |
| UB | User bit - untouched by CP |
| LG | Rx Frame Length Violation |
| NO | Rx Nonoctet Aligned Frame |
| AB | Rx Abort Sequence received |
| CR | Rx CRC Error detected in frame |
| Data Length | Number of octets written by CP into BD's data buffer. When last BD (L = 1), length contains the total number of frame octets received. |
| Rx Buffer Ptr | Pointer to receive buffer |

Table T-21 shows the layout of a Transmit Buffer Descriptor (TxBD) table entry. It is similar to the RxBD table shown in Table T-19.

TABLE T-21

TRANSMIT BUFFER DESCRIPTOR (Tx BD)

| | 0f | 0e | 0d | 0c | 0b | 0a | 09 | 08 | 07 | 06 | 05 | 04 | 03 02 01 00 |
|---|---|---|---|---|---|---|---|---|---|---|---|---|---|
| 0 | R | — | W | I | L | TC | CM | — | UB | — | — | — | Pad |
| 2 | | | | | | | Data Length | | | | | | |
| 4 | | | | | | | | | | | | | |
| 6 | | | | | | | Tx Data Buffer Pointer | | | | | | |

A Transmit Buffer Descriptor (TxBD) table consists of one or more sequentially arranged TxBD entries where the table is terminated with a TxBD entry with the Wrap (W) bit set. The current TxBD table entry being processed for a channel is indexed by the TBPTR entry in the Channel table. Table T-22 contains the TxBD table entry definitions.

TABLE T-22

Transmit Buffer Fields

| Field Name | Description |
|---|---|
| R | Ready |
| | 0 = data buffer associated with BD not ready yet Bit cleared after BD transmitted or error. |
| | 1 = data buffer associated with BD is ready but has not yet been transmitted. |
| W | Wrap (final BD in Table) |
| | 0 = Not last buffer descriptor in BD table |
| | 1 = last buffer descriptor in BD table |
| I | Interrupt |
| | 0 = No interrupt generated after buffer serviced |
| | 1 = TXB in HDLC circular interrupt table entry will be set after buffer serviced. This may cause an interrupt (if enabled). |
| L | Last in Frame |
| | 0 = Buffer not last in a frame |
| | 1 = Buffer the last in a frame |
| TC | Tx CRC (only valid if L = 1) |
| | 0 = Transmit closing flag after last data byte |
| | 1 = Transmit CRC after last data byte (then flag) |
| CM | Continuous Mode |
| | 0 = Normal operation |
| | 1 = Empty (E) bit not set by CP after BD closed allows overwrite of buffer when next accessed by CP |
| UB | User bit - untouched by CP |
| PAD | Number of pad PAD characters (7E or 7F) that transmitter will send after closing flag. |
| Data Length | Number of bytes to transmit from buffer |
| Rx Buffer Ptr | Pointer to buffer from which to transmit |

Controlling high level operation of the Channel is the Channel Mode Register (CHAMR) found in the Channel Table shown in Table T-18. The CHAMR flags and bit allocations are illustrated in Table T-23.

TABLE T-23

CHAMR (Channel Mode Register)

| 0f | 0e | 0d | 0c | 0b | 0a | 09 | 08 | 07 | 06 | 05 | 04 | 03 | 02 | 01 | 00 |
|---|---|---|---|---|---|---|---|---|---|---|---|---|---|---|---|
| M | R | 1 | E | 0 | S | — | P | 0 | 0 | 0 | 0 | 0 | 0 | 0 | 0 |
| O | D | | N | | Y | | O | | | | | | | | |
| D | | | T | | N | | L | | | | | | | | |
| E | | | | | C | | | | | | | | | | |

Table T-24 contains descriptions of the Channel Mode Register flags shown in Table T-23.

TABLE T-24

CHAMR Fields

| Field Name | Description |
|---|---|
| MODE | Mode |
| | 1 = HDLC |
| | 0 = Transparent |
| RD | Reverse Data |
| | 0 = Transmit LSB first |
| | 1 = Transmit MSB first |
| ENT | Enable Transmit |
| | 0 = send idles (1's) in this timeslot |
| | 1 = send data |
| SYNC | Synchronization |
| | 0 = first byte sent in first timeslot |
| | 1 = use TRNSYNC to determine 1st byte sent |
| POL | Enable Polling |
| | 0 = Ignore BD R bits |
| | 1 = Check BD R bits for output data |

Figure 19:
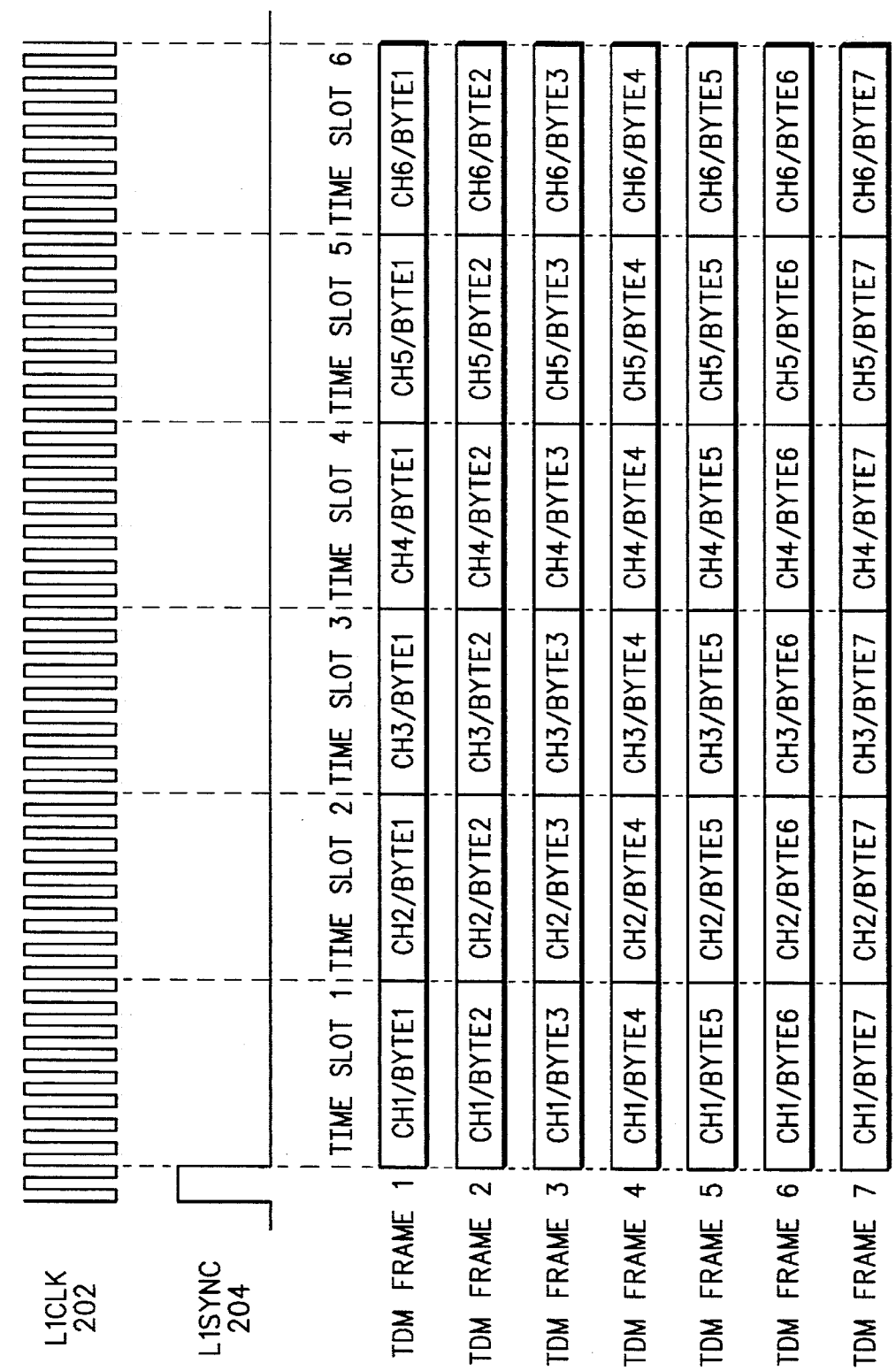
FIGS. 19 and 20 are diagrams showing the operation of TDM Channels.

FIG. 19 is a diagram showing the operation of TDM Channels. Time Division Multiplexing (TDM) is a technique that allows several communications channels to share the same physical media. The data stream of each channel is divided into a number of smaller packages. Each of the channels is then assigned a small portion of the TDM line in a repetitive pattern. This is called a timeslot.

As illustrated above in Tables T-1 and T-2, T1 multiplexes 24 eight-bit time slots or channels onto a 193 bit frame, while E1 multiplexes 32 eight bit channels onto a 256 bit frame. Each channel is allocated eight bits of the input or output stream. The next channel is allocated the next eight bits.

For synchronous data communications, a clock must be provided by either a modem or the receiver. In FIG. 19, a clock signal, L1CLK 202, is shown. The signal shows eight full clock cycles per eight bit byte, code word, or channel slot. This is illustrative only, as the ratio between clock cycles and I/O bits may not be one-to-one.

A sync signal, L1SYNC 204, is also shown. It can be generated based on the sync patterns in T1 and E1 communications as shown in Tables T-1 and T-2. A sync signal will be asserted at the beginning of each T1 or E1 frame.

The beginning of seven TDM frames are shown in FIG. 19. The first six timeslots in each of the seven TDM frames are also shown. In TDM Frame #1, eight bits of CH1/Byte1 are sent or received, followed by eight bits of CH2/Byte1, etc. TDM Frame #1 is followed by TDM Frame #2, which begins with eight bits of CH1/Byte1.

Figure 20:
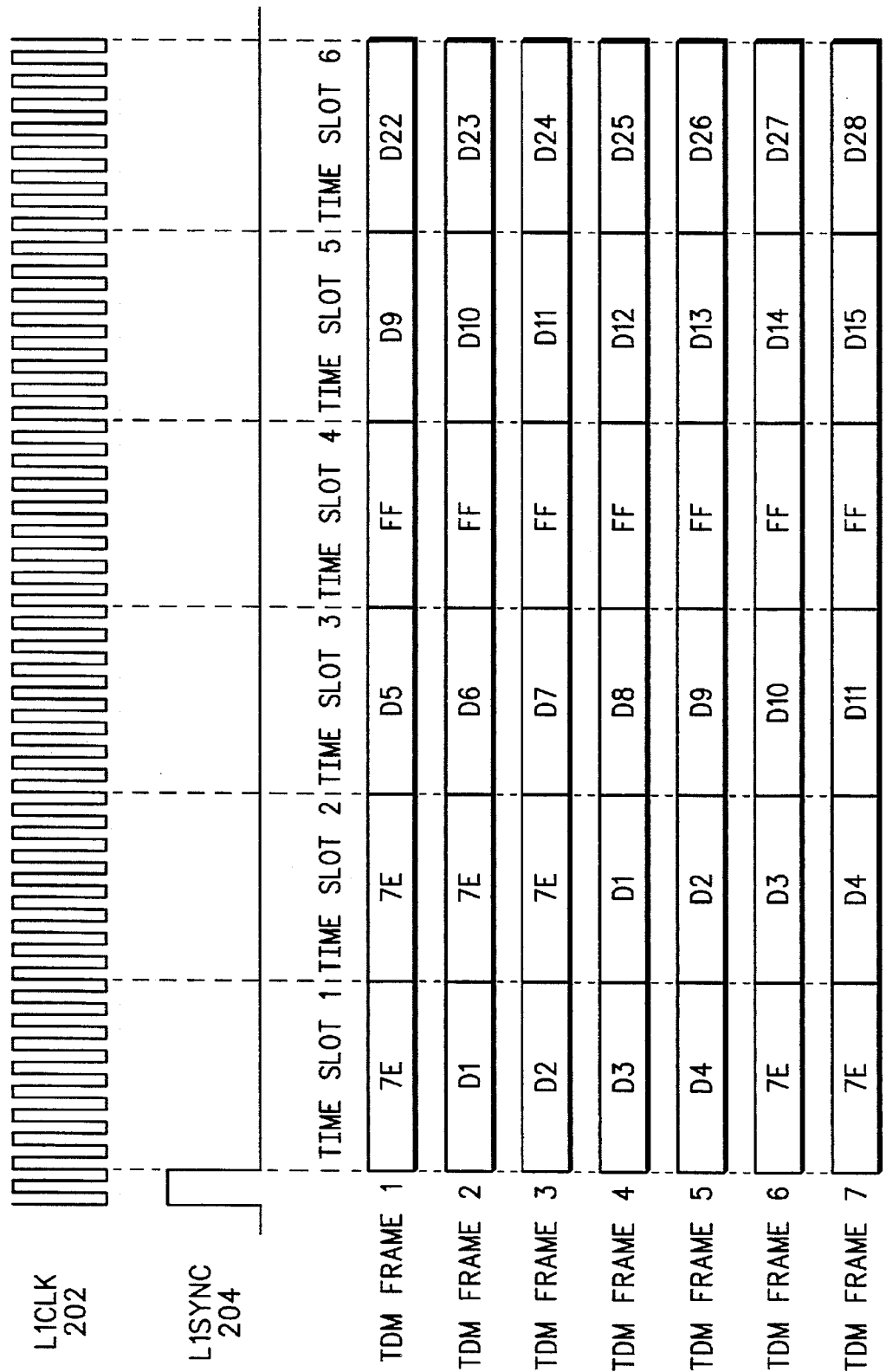

FIG. 20 is a diagram related to FIG. 19 further showing TDM operation. It shows actual data for the first six time slots of seven frames. Time Slot #1 has a four byte message (D1, D2, D3, D4) delimited by HDLC flags (7E). Note that in normal HDLC operation, a new message could have started in TDM Frame #7, sharing the flag in TDM Frame #6 with the message that ended in TDM Frame #5. Time Slot #2 has the first four bytes of a message (D1, D2, D3, D4) following three flag bytes (7E). Time Slots #3, #5, and #6 each have seven bytes of messages. Time Slot #4 is idle, defined as solid one bits (FF). It should be noted that this example shows flags and data being byte aligned in the TDM Frames. This is for illustrative purposes only since HDLC bit stuffing will cause byte alignment to be quickly lost.

Figure 21:
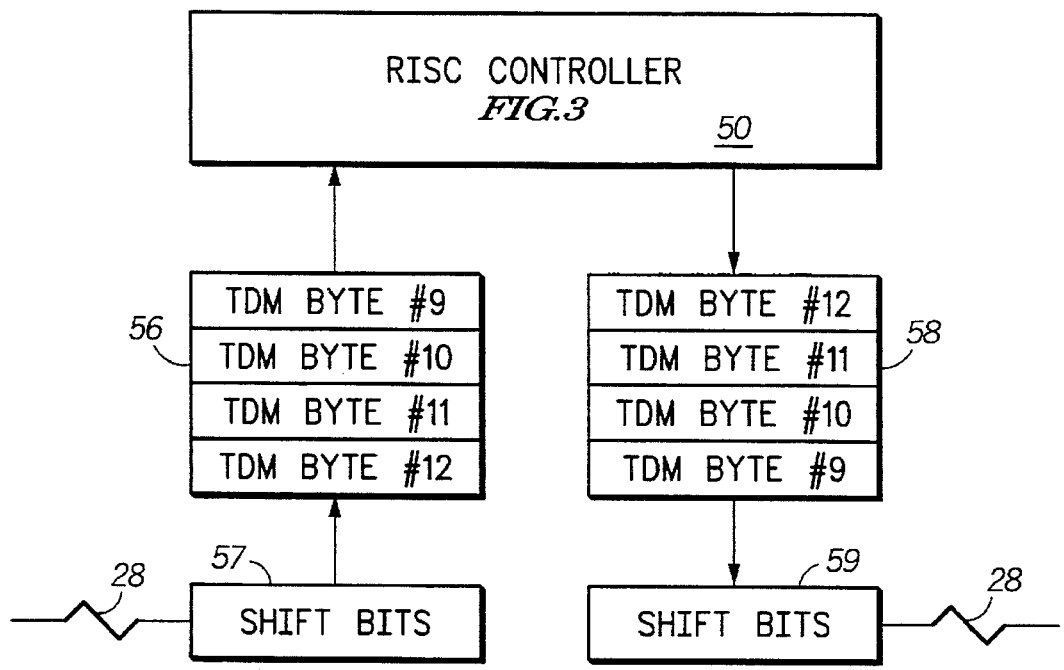
FIGS. 21 and 22 are block diagrams showing input and output operation on a TDM line in accordance with the present invention.

FIG. 21 is a block diagram showing input and output operation on a TDM line. The RISC Controller 50 communicates with SCCs 60, 62, 64, 66 (see FIG. 2) with First-In/First-Out (FIFO) queues. Each SSC has an input FIFO queue 56 and an output FIFO queue 58. In the current implementation, SSC1 60 has 32 byte FIFO queues, and the other SSCs 62, 64, 66 have 16 byte FIFO queues. SSC1 60 is thus preferred for T1 and E1 communications due to the high transfer rate involved.

As an SSC receives input bits from a communications line 28, the bits are shifted into an input shift register 57 until eight bits have been accumulated, at which time the eight bits are placed in the SSC's input FIFO queue 56. Output works in a similar manner. A byte at a time is placed in the output shift register 59. Bits are shifted out of the output shift register 59 a bit at a time until all eight bits in the byte have been transmitted out onto the communications line 28. At that time, another byte is removed from the output FIFO queue 58 and transmitted. Note that the FIFO queues 56, 58 in TDM mode contain one byte for Time Slot #1, followed by one byte for Time Slot #2, etc. Thus, the SSC1 60 32 byte FIFO queues 56, 58 can contain one entire T1/E1 frame.

Due to the high speeds of T1 and E1 lines, one problem that can arise when using 16 and 32 byte FIFO queues 56, 58 is that the RISC controller 50 gets behind in inserting output bytes in an output FIFO queue 56, or removing and processing input bytes from an input FIFO queue 58. This underrunning and overrunning is fatal for all channels on the communications line.

One possible solution to this problem is to extend the size of the FIFO queues 56, 58 so that they are long enough for worst case situations. This can get quite expensive in terms of silicon real estate. A better solution relies on understanding that the bulk of the RISC Controller 50 processing is done at the beginning and end of HDLC blocks. One reason for this is the necessity of allocating and deallocating buffers at these times. Worst case of course is when multiple TDM channels start and/or end HDLC blocks at the same time.

Figure 22:
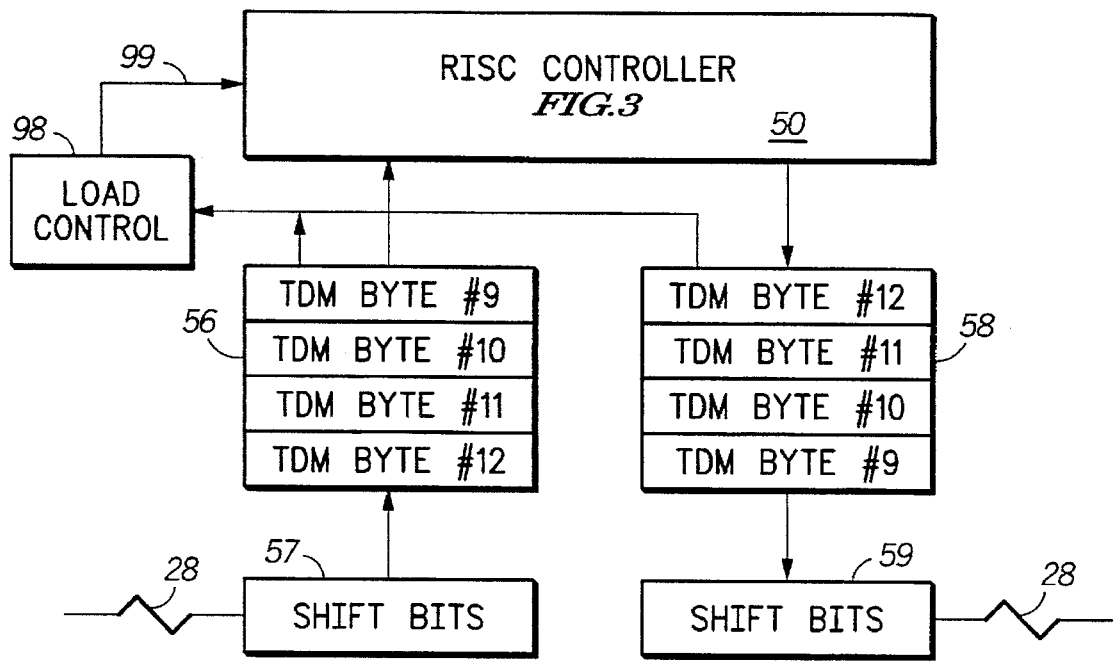

FIG. 22 is a block diagram showing this preferred solution. It is identical with FIG. 21 with the addition of a Load Control module 98.

The Load Control module 98 detects when either the input FIFO 56 or output FIFO 58 queue becomes dangerously low in availability. If either the input FIFO queue 56 is dangerously close to overflowing, or the output FIFO queue 58 is dangerously close to under flowing, a throttle signal 99 is asserted. When the throttle signal 99 is asserted, the RISC controller 50 doesn't start or complete output blocks. Rather, it inserts flag bytes (7E) in the output FIFO queue 56 for each channel or timeslot in which a block needs either to be started or completed. The flag (7E) insertion is terminated when neither the input FIFO queue 56 nor the output FIFO queue 58 is any longer in a dangerous condition and the throttle signal 99 is no longer asserted.

Referring back to FIG. 20, operation of this solution can be seen. In Time Slot #1, a second flag byte (7E) is shown inserted at the end of the block. Likewise, Time Slot #2 shows multiple flag bytes (7E) before the beginning of a block. It should be noted that the HDLC protocol requires that empty blocks are ignored on input. These empty blocks occur when flag bytes (7E) are adjacent. Thus, the four byte block shown in Time Slot #1 can be processed as a complete block by the receiver, even while kept open by the transmitter.

Figure 23:
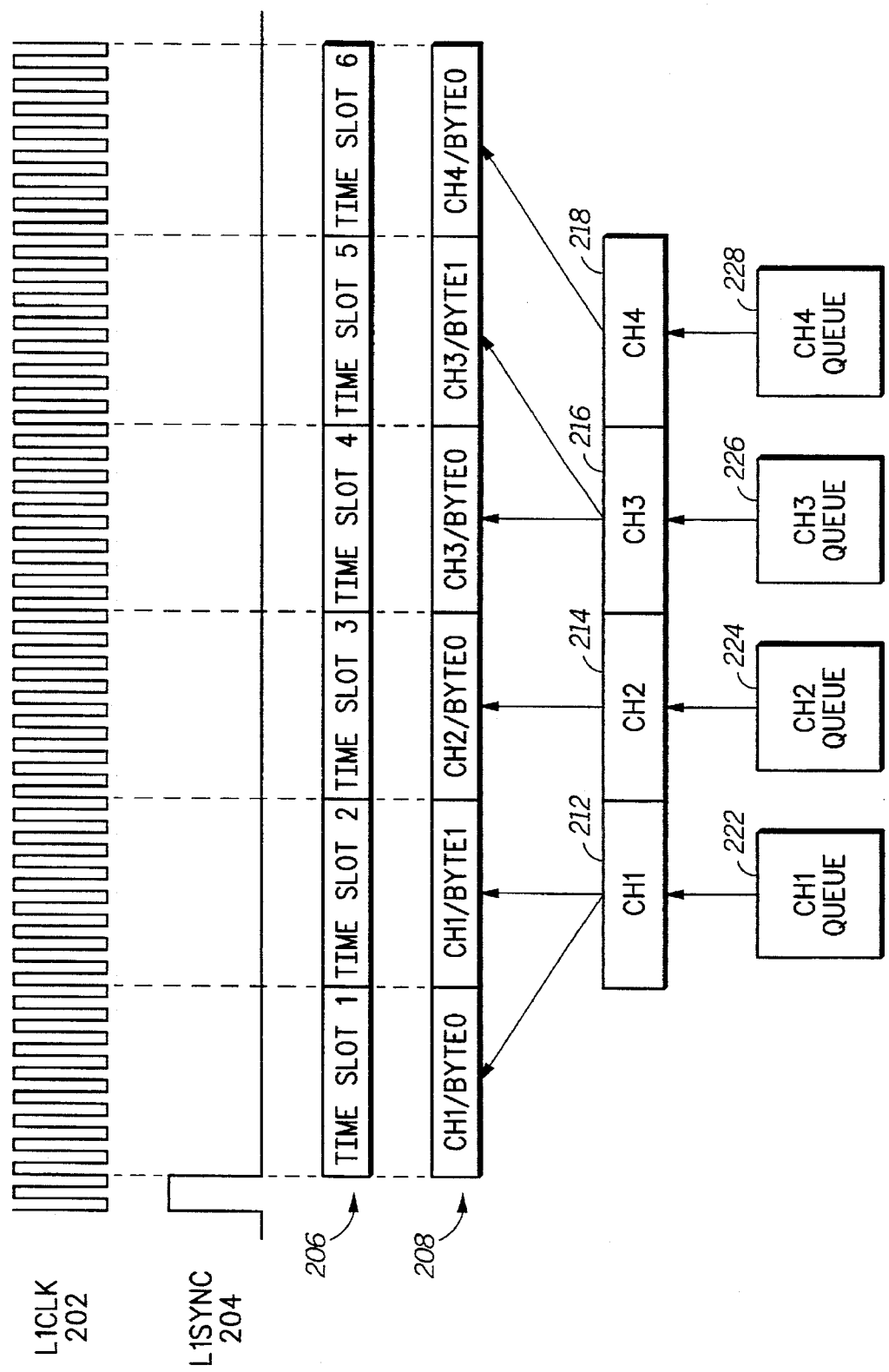
FIG. 23 is a block diagram that shows implementation of TDM Superchannels in accordance with the present invention.

FIG. 23 is a block diagram that shows implementation of TDM Superchannels. Following L1SYNC 204 in FIG. 23 are the multiple time slots 206 that constitute a TDM frame. This allocation is repeated for each frame. Corresponding to each eight bit time slot is a TDM channel 208.

In a TDM Superchannel, more than one TDM channel 208 is assigned to a single logical channel 212, 216. In FIG. 23, logical channel CH1 212 is assigned to two TDM channels: one corresponding to Time Slot 1, and the other to Time Slot 2. Likewise logical channel CH3 216 is assigned to TDM channels corresponding to Time Slots 4 and 5. Contrast these two Superchannels with conventional channels such as CH2 214 assigned to the TDM channel corresponding to Time Slot 3, and CH4 218 assigned to the TDM channel corresponding to Time Slot 6.

Each logical channel has a corresponding input queue and an output queue. Thus, logical channel CH1 212 utilizes the CH1 queue 222, logical channel CH2 214 utilizes CH2 queue 224, logical channel CH3 216 utilizes CH3 Queue 226, and logical channel CH4 218 utilizes the CH4 Queue 228.

It should first be noted that there is no reason that the TDM channels that constitute a Superchannel need to be adjacent. Also note that the bits in a Superchannel are treated as if they were continuous. In the example shown in FIG. 23, for output on logical channel CH1 212, bytes are sequentially retrieved from the CH1 channel 222. The bits in the retrieved bytes are "bit stuffed" into HDLC frames. The first eight bits in the resulting sequential stream of bits are transmitted in Time Slot 1, followed by the next eight bits in Time Slot 2. This is repeated for successive frames.

One problem encountered when implementing TDM Superchannels is that if output on a Superchannel does not start with the first actual time slot assigned to a Superchannel, the receiver can get out of sync. This can easily happen if care is not taken when implementing Superchannels.

Figure 24:
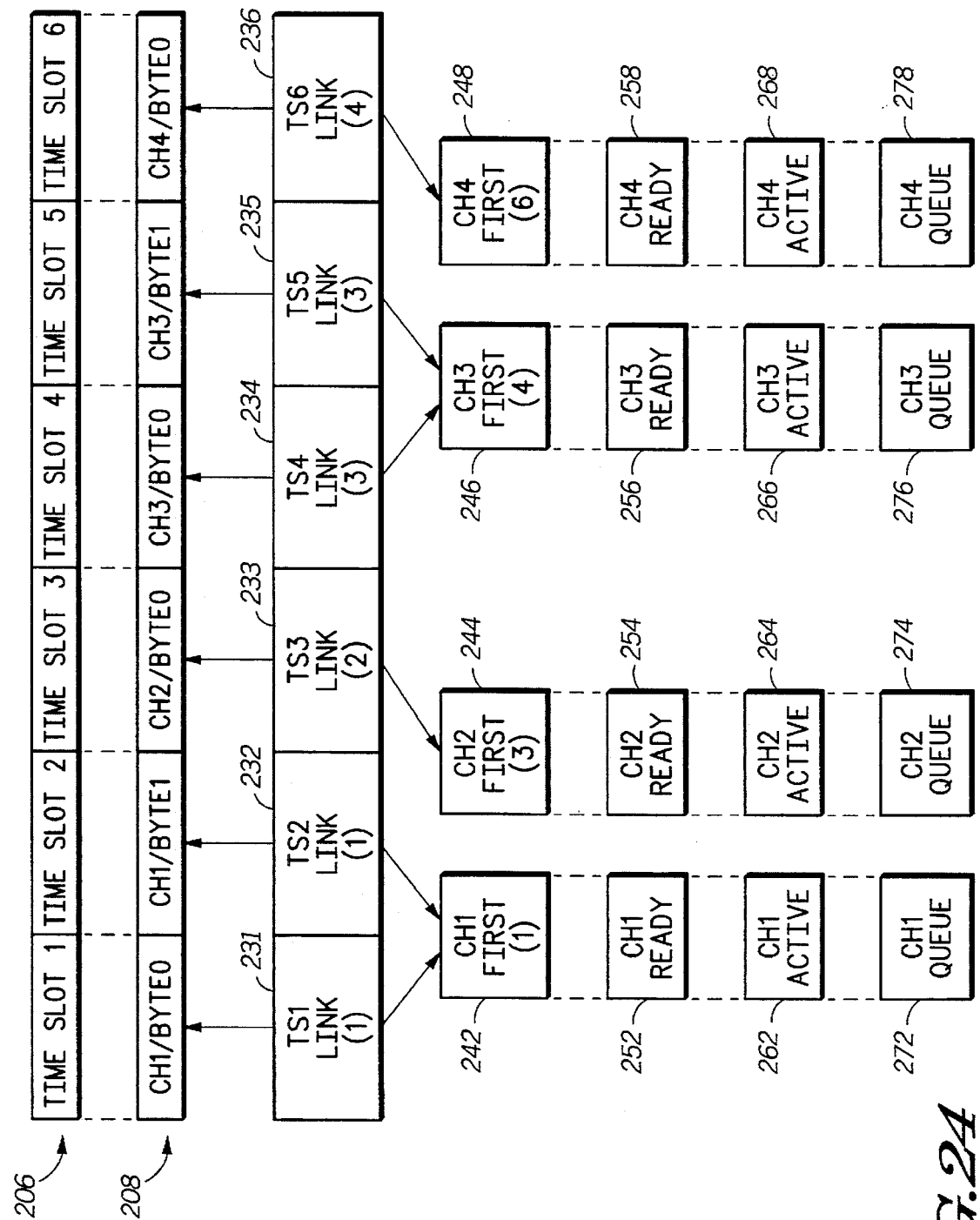
FIG. 24 is a block diagram showing the relationship among tables in Memory in accordance with the present invention.

FIG. 24 is a block diagram showing the relationship among tables for an implementation solving that problem. The same Time Slots 206 and TDM channels 208 are shown as were shown in FIG. 23. Each TDM channel has a channel entry. The TS1 Link 231 is logically connected to CH1/Byte0, TS2 Link 232 is logically connected to CH1/Byte1, TS3 Link 233 is logically connected to CH2/Byte0, TS4 Link 234 is logically connected to CH3/Byte 0, TS5 Link 235 is logically connected to CH3/Byte 1, and the TS6 Link 236 is logically connected to CH4/Byte0.

Each of the logical channel entries is also connected logically to a Logical Channel table. Each logical channel table has a ready flag 252, 254, 256, 258, an active flag 262, 264, 266, 268, and an output queue 272, 274, 276, 278.

Preferably, there should also be available means for determining whether a given time slot is the first time slot for a given logical channel. In the example given, there is a field associated with each logical channel that contains a pointer or index identifying the first corresponding time slot. In the example, logical channel CH1 first 242 contains a one, indicating that it the first associated time slot is time slot 1. CH2 first 244 contains a 3 indicating that time slot 3 is its first (and only) associated time slot. Likewise the CH3 First entry 246 contains a 4 associating it with Time Slot 4, and CH4 First 248 contains a 6 associating it with time slot 6. Note though that other means for identifying the first time slot in a logical channel may be used. Another way to accomplish this would be to utilize a flag for each time slot.

When implemented utilizing the tables shown in FIG. 18 and Table T-15 through T-22, the Global Table 180 contains pointers Tx_S_PTR and Rx_S_PTR that point at send (Tx) and receive (Rx) Time Slot Assignment tables. The actual Time Slot Assignment tables are located at locations TSATRx and TSATTx in the Global Table 180. Note that this arrangement allows the two time slot assignment tables to be shared.

The correspondence between TSA entries and time slots 206 is implicit in the ordering of the TSA entries in a TSA table: the first TSA entry in a TSA table corresponds to the first time slot after the sync signal, and the second TSA entry corresponds to the second time slot, etc.

Each TSA entry has a Channel Pointer (Table T-16). The Channel Pointer is used to identify the corresponding logical channel. Thus both the TS1 Link 231 and TS2 Link 232 contain (1), pointing to the same Channel Table (1). The low order byte of the TRNSYNC field in the Channel Table (Table T-18) is used to identify the first time slot in a Superchannel. Thus, in the Channel 1 table (CH1 First 242), the byte in the TRNSYNC field will contain a 1, corresponding to Time Slot 1, while the corresponding byte in the Channel 2 table will contain a 3, identifying Time Slot 3.

The Channel Ready function 252, 254, 256, 258 is accomplished by utilizing the "POL" field in the Channel Mode Register (Table T-23) in the Channel Table (Table T-18). After data is enqueued for output in the Transmit Buffers, the "POL" flag is set. The Channel Active function 262, 264, 266, 268 is accomplished by utilizing information in the low order bits of the TSTATE field in the Channel Table (Table T-18). Finally, the output queue 272, 274, 276, 278 functionality is accomplished by utilizing Transmit Buffer Descriptors (BD) (Table T-21) in a Transmit BD Table 193 (see FIG. 18).

Figure 25:
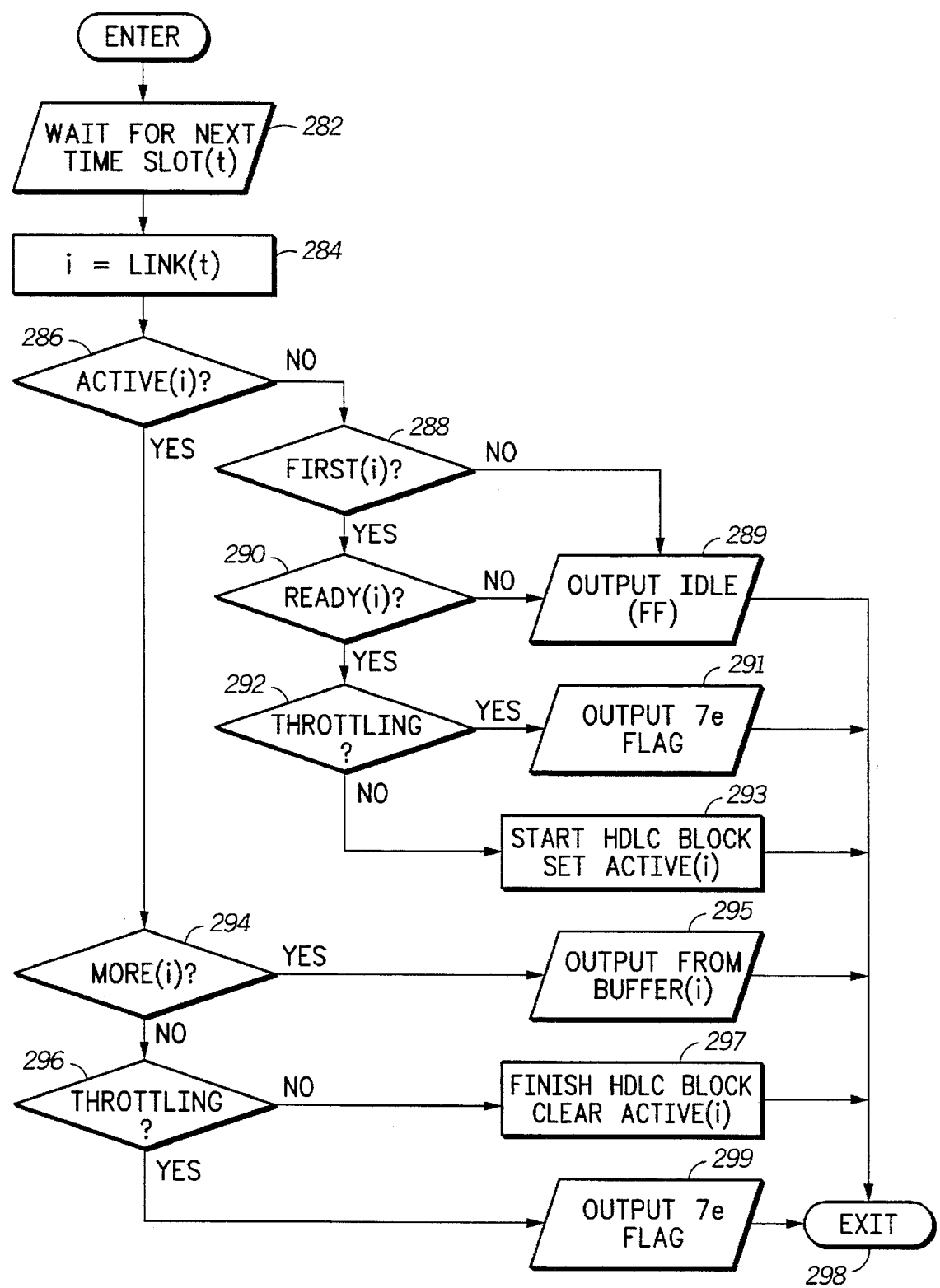
FIG. 25 is a flow chart that illustrates both throttle flag (7E) insertion and Superchannel synchronization in accordance with the present invention.

FIG. 25 is a flow chart that illustrates both throttle flag (7E) insertion and Superchannel synchronization. The routine is entered each time the RISC Controller 50 inserts an eight bit byte into the output FIFO queue 58. If necessary, the time for transmitting the next time slot is awaited, step 282. Once the time slot is available in the output FIFO queue 58, the index to the corresponding Channel Table is determined by utilizing the time slot as an index into a link table, step 284. In the embodiment disclosed above, the Channel Table index or Channel Number is extracted from the Channel Pointer field of the Transmit Time Slot Assignment Table (Table T-16).

Once the appropriate channel table has been determined, step 284, a check is made whether I/O is active, step 286. If not, a check is then made whether this is the first time slot in a Superchannel, step 288. In the disclosed embodiment, this is done by comparing the low order byte of TRNSYNC in the Channel Table with the Channel Number. If this is the first time slot for the channel, a check is made whether I/O is ready, step 290. This is done in the disclosed embodiment by testing the "POL" flag in the Channel Mode Register for the channel. If either not the first time slot, step 288, or output is not ready, step 290, an Idle (FF) byte is placed in the output FIFO queue 58, step 289, before exiting, step 298.

If the channel is not active, step 286, but this is the first time slot in a Superchannel, step 288, and the channel is ready for output, step 290, a check is made for throttling, step 292. If the throttling signal 99 is asserted, step 292, a flag (7E) byte is placed in the output FIFO queue 58, step 291, before exiting, step 298. Otherwise, a new HDLC block is started and I/O is set active, step 293, before exiting, step 298.

In the case where the channel was already active, step 286, a check is made whether there is more data to transmit on the channel, step 294. This can be determined in the disclosed embodiment by checking the Buffer Descriptors (BDs) in the Transmit BD Table 193 for the Channel. If more output is available, step 294, one byte is placed in the output FIFO queue 58, step 295, before exiting, step 298.

Otherwise, a check is made for throttling, step 296. If not throttling, step 296, the frame is completed and the active flag is cleared, step 298, before exiting, step 298. The block completion, step 297, may require transmitting a CRC and closing flag (7E). If throttling though, step 296, instead of finishing the block, step 297, a flag (7F) is placed in the output FIFO 58, step 299, for that time slot before exiting, step 298 and the block is considered still open.

The above routine efficiently guarantees that transmission on a Superchannel will always start in a selected time slot assigned to the Superchannel. It was assumed above that the time slot selected as first is the first time slot in the Superchannel. But a closer look at the implementation disclosed reveals that this is not necessary. Rather the low order byte of TRNSYNC can be initialized with any time slot number in a Superchannel, and the Superchannel will always start transmitting in that time slot.

A similar routine can be utilized for receiving data on a TDM Superchannel. In this case, the high order byte of TRNSYNC contains the time slot number of the first time slot to receive data. This allows incoming data in the other time slots in a Superchannel to be ignored until an opening HDLC flag is found in the first time slot. Of course, a receiver can also be configured to look for an opening flag in any time slot in a Superchannel. Finally note that in both routines, channels that are not part of Superchannels can be treated as Superchannels with just one time slot.

Those skilled in the art will recognize that modifications and variations can be made without departing from the spirit of the invention. Therefore, it is intended that this invention encompass all such variations and modifications as fall within the scope of the appended claims.

We claim:

1. A method of synchronizing Time Division Multiplexer (TDM) Superchannels, wherein:

a data stream transmitted as signals over a high speed link is divided into a plurality of fixed length divisions, each of the plurality of fixed length divisions corresponds to one of a plurality of time slots on a cyclical basis, each of one or more logical channels is assigned a different set of one or more of the plurality of time slots, and at least one of the one or more logical channels is a Superchannel, wherein:

each said Superchannel is assigned two or more of the plurality of time slots, and each said Superchannel has a first time slot, said method comprising the steps of:

(a) determining whether output is active on a selected Superchannel;

(b) determining whether a given time slot is the first time slot of the selected Superchannel;

(c) determining whether output is available for the selected Superchannel;

(d) starting output for the selected Superchannel in the given time slot when output was determined not to be active in step (a), the given time slot was determined to be the first time slot in step (b), and output was determined to be available in step (c); and (e) postponing starting output for the selected Superchannel in the given time slot when output was determined not to be active in step (a) and the given time slot was determined not to be the first time slot in the selected Superchannel in step (b).

2. The method in claim 1 wherein:

the high speed link utilizes a T1 signal consisting of 24 eight bit time slots plus one framing bit per 193 bit frame transmitted every 125μ Seconds.

3. The method in claim 1 wherein:
the high speed link utilizes an E1 signal consisting of 32 eight bit time slots per 256 bit frame transmitted every 125µ Seconds.

4. The method in claim 1 wherein:
said plurality of the fixed length divisions are eight bit code words.

5. The method in claim 1 which further comprises:
(f) storing a plurality of channel tables in a Memory, wherein:
each channel table corresponds to a different one of the one or more logical channels.

6. The method in claim 5 wherein step (b) comprises:
(1) testing an index corresponding to the given time slot against an entry in a corresponding channel table.

7. The method in claim 5 wherein step (c) comprises:
(1) identifying an output buffer pool from an entry in a channel table corresponding to the given time slot; and
(2) testing the output buffer pool identified in substep (1) for available output.

8. The method in claim 1 wherein:
data on at least one of the one or more logical channels is transmitted in HDLC format.

9. The method in claim 8 wherein within step (e):
HDLC idle bits are transmitted.

10. A method of synchronizing Time Division Multiplexer (TDM) Superchannels, wherein:
a data stream transmitted as signals over a high speed link is divided into a plurality of fixed length divisions,
a plurality of the fixed length divisions are eight bit code words,
each of the plurality of fixed length divisions corresponds to one of a plurality of time slots on a cyclical basis,
each of one or more logical channels is assigned a different set of one or more of the plurality of time slots, and
at least one of the one or more logical channels is a Superchannel, wherein:
each said Superchannel is assigned two or more of the plurality of time slots, and
each said Superchannel has a first time slot,
said method comprising the steps of:
(a) storing a plurality of channel tables in a Memory, wherein: each channel table corresponds to a different one of the one or more logical channels;
(b) determining whether output is active on a selected Superchannel;
(c) determining whether a given time slot is the first time slot of the selected Superchannel by testing an index corresponding to the given time slot against an entry in a corresponding channel table;
(d) determining whether output is available for the selected Superchannel;
(e) starting output for the selected Superchannel in the given time slot when output was determined not to be active in step (b), the given time slot was determined to be the first time slot in step (c), and output was determined to be available in step (d); and
(f) postponing starting output for the selected Superchannel in the given time slot when output was determined not to be active in step (b) and the given time slot was determined not to be the first time slot in the selected Superchannel in step (c).

11. An apparatus for synchronizing Time Division Multiplexer (TDM) Superchannels, wherein:
a data stream transmitted as signals over a high speed link is divided into a plurality by of fixed length divisions;
each of the plurality of fixed length divisions corresponds to one of a plurality of time slots on a cyclical basis;
each of one or more logical channels is assigned a different set of one or more of the plurality of time slots, and
at least one of the one or more logical channels is a Superchannel; wherein:
each said Superchannel is assigned two or more of the plurality of time slots, and
each said Superchannel has a first time slot,
said apparatus comprising:
(a) means for determining whether output is active on a selected Superchannel;
(b) means for determining whether a given time slot is the first time slot of the selected Superchannel;
(c) means for determining whether output is available for the selected Superchannel;
(d) means for starting output for the selected Superchannel in the given time slot when out-put was determined not to be active by means (a), the given time slot was determined to be the first time slot by means (b), and output was determined to be available by means (c); and
(e) means for postponing starting output for selected Superchannel in the given time slot when output was determined not to be active by means (a) and the given time slot was determined not to be the first time slot in the selected Superchannel by means (b).

12. The apparatus in claim 11 wherein:
the high speed link utilizes a T1 signal consisting of 24 eight bit time slots plus one framing bit per 193 bit frame transmitted every 125µ Seconds.

13. The apparatus in claim 11 wherein:
the high speed link utilizes an E1 signal consisting of 32 eight bit time slots per 256 bit frame transmitted every 125µ Seconds.

14. The apparatus in claim 11 wherein:
said plurality of the fixed length divisions are eight bit code words.

15. The apparatus in claim 11 which further comprises:
(f) a Memory; and
(g) means for storing a plurality of channel tables in the Memory, wherein:
each channel table corresponds to a different one of the one or more logical channels.

16. The apparatus in claim 15 wherein means (b) comprises:
(1) means for testing an index corresponding to the given time slot against an entry in a corresponding channel table.

17. The apparatus in claim 15 wherein means (c) comprises:
(1) means for identifying an output buffer pool from an entry in a channel table corresponding to the given time slot; and
(2) means for testing the output buffer pool identified in subelement (1) for available output.

18. The apparatus in claim 11 wherein:
data on at least one of the one or more logical channels is transmitted in HDLC format.

19. The apparatus in claim 18 wherein within means (e):
HDLC idle bits are transmitted.

20. An apparatus of synchronizing Time Division Multiplexer (TDM) Superchannels, wherein:

a data stream transmitted as signals over a high speed link is divided into a plurality of fixed length divisions, a plurality of the fixed length divisions are eight bit code words, each of the plurality of fixed length divisions corresponds to one of a plurality of time slots on a cyclical basis, each of one or more logical channels is assigned a different set of one or more of the plurality of time slots, at least one of the one or more logical channels is a Superchannel, wherein:

each said Superchannel is assigned two or more of the plurality of time slots, and each said Superchannel has a first time slot, said apparatus comprising:

(a) a Memory;

(b) means for storing a plurality of channel tables in the Memory, wherein:

each channel table corresponds to a different one of the one or more logical channels;

(c) means for determining whether output is active on a selected Superchannel;

(d) means for determining whether a given time slot is the first time slot of the selected Superchannel by testing an index corresponding to the given time slot against an entry in a corresponding channel table;

(e) means for determining whether output is available for the selected Superchannel;

(f) means for starting output for the selected Superchannel in the given time slot when output was determined not to be active by means (c), the given time slot was determined to be the first time slot by means (d), and output was determined to be available by means (e); and (g) means for postponing starting output for the selected Superchannel in the given time slot when out-put was determined not to be active by means (c) and the given time slot was determined not to be the first time slot in the selected Superchannel by means (d).

21. An apparatus for synchronizing Time Division Multiplexer (TDM) Superchannels, wherein:

a data stream transmitted as signals over a high speed link is divided into a plurality of fixed length divisions, each of the plurality of fixed length divisions corresponds to one of a plurality of time slots on a cyclical basis, each of one or more logical channels is assigned a different set of one or more of the plurality of time slots, at least one of the one or more logical channels is a Superchannel, wherein:

each said Superchannel is assigned two or more of the plurality of time slots, and each said Superchannel has a first time slot, said apparatus comprising:

(a) electronic circuitry for determining whether output is active on a selected Superchannel;

(b) electronic circuitry for determining whether a given time slot is the first time slot of the selected Superchannel;

(c) electronic circuitry for determining whether output is available for the selected Superchannel;

(d) electronic circuitry for starting output for the selected Superchannel in the given time slot when output was determined not to be active by circuitry (a), the given time slot was determined to be the first time slot by circuitry (b), and output was determined to be available by circuitry (c); and (e) electronic circuitry for postponing starting output for the selected Superchannel in the given time slot when output was determined not to be active by circuitry (a) and the given time slot was determined not to be the first time slot in the selected Superchannel by circuitry (b).

* * * * *